United States Patent
Kokubo et al.

(10) Patent No.: US 11,179,876 B2
(45) Date of Patent: Nov. 23, 2021

(54) TRANSFER APPARATUS AND TRANSFER METHOD

(71) Applicant: TOSHIBA KIKAI KABUSHIKI KAISHA, Tokyo (JP)

(72) Inventors: Mitsunori Kokubo, Numazu (JP); Takato Baba, Mishima (JP); Toshiaki Goto, Numazu (JP)

(73) Assignee: SHIBAURA MACHINE CO., LTD., Tokyo (JP)

(*) Notice: Subject to any disclaimer, the term of this patent is extended or adjusted under 35 U.S.C. 154(b) by 187 days.

(21) Appl. No.: 16/170,790

(22) Filed: Oct. 25, 2018

(65) Prior Publication Data

US 2019/0118457 A1 Apr. 25, 2019

(30) Foreign Application Priority Data

Oct. 25, 2017 (JP) .............................. JP2017-205740

(51) Int. Cl.
| | |
|---|---|
| B29C 59/04 | (2006.01) |
| B29C 59/14 | (2006.01) |
| B29C 33/72 | (2006.01) |
| B29C 59/00 | (2006.01) |
| B29C 35/08 | (2006.01) |

(52) U.S. Cl.
CPC ............ B29C 59/046 (2013.01); B29C 33/72 (2013.01); B29C 59/002 (2013.01); *B29C 2033/725* (2013.01); *B29C 2035/0827* (2013.01); *B29C 2059/145* (2013.01)

(58) Field of Classification Search
CPC .............................. B29C 59/02; B29C 59/026
See application file for complete search history.

(56) References Cited

U.S. PATENT DOCUMENTS

| | | | | |
|---|---|---|---|---|
| 5,189,444 | A | * 2/1993 | Yamada | ................... B41J 15/02 347/115 |
| 9,604,402 | B2 | 3/2017 | Sugiura et al. | |
| 2013/0323347 | A1 | 12/2013 | Itani et al. | |
| 2014/0057079 | A1* | 2/2014 | Sugiura | ................. B29C 59/043 428/156 |
| 2015/0202829 | A1 | 7/2015 | Toriyama | |

(Continued)

FOREIGN PATENT DOCUMENTS

| | | |
|---|---|---|
| JP | 2005-297277 | 10/2005 |
| JP | 2007-076185 | 3/2007 |
| JP | 2012-081618 | 4/2012 |

(Continued)

OTHER PUBLICATIONS

Decision to Grant issued for JP 2017-205740, dated Jun. 6, 2018.
Taiwanese Office Action in Application No. 20160124686 dated May 2, 2019.

*Primary Examiner* — Christopher T Schatz
(74) *Attorney, Agent, or Firm* — DLA Piper LLP US

(57) ABSTRACT

A transfer apparatus includes a rolled web mold installation part for installing a rolled web mold around which the mold is wound, a transfer roller for winding the mold fed out from the rolled web mold, a winding roll for winding up the mold, a winding roll installation part for installing the winding roll therein, and a mold installation assisting part for guiding the mold fed out from the rolled web mold up to the winding roll while suppressing an occurrence of wrinkles in the mold fed out from the rolled web mold.

6 Claims, 22 Drawing Sheets

(56) References Cited

U.S. PATENT DOCUMENTS

2015/0231820 A1\* 8/2015 Kokubo ................ B29C 59/002
  428/172
2017/0305085 A1  10/2017 Lee et al.

FOREIGN PATENT DOCUMENTS

| JP | 2014-040070 | 3/2014 |
| JP | 2014-069524 | 4/2014 |
| JP | 2016-127031 | 7/2016 |
| TW | 2017-38097 | 11/2017 |
| WO | WO 2014-054678 | 4/2014 |

\* cited by examiner

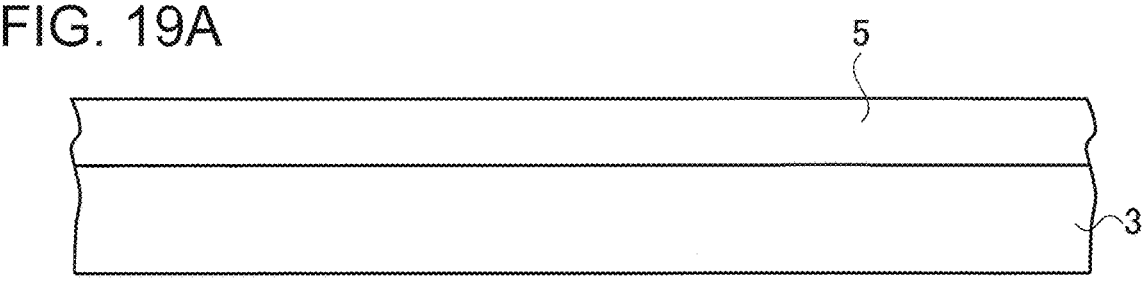
FIG. 19A
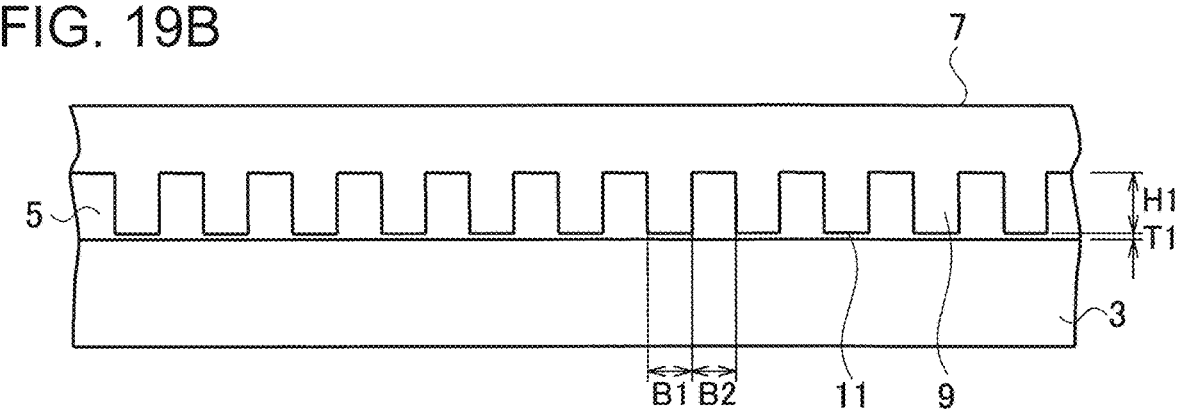
FIG. 19B
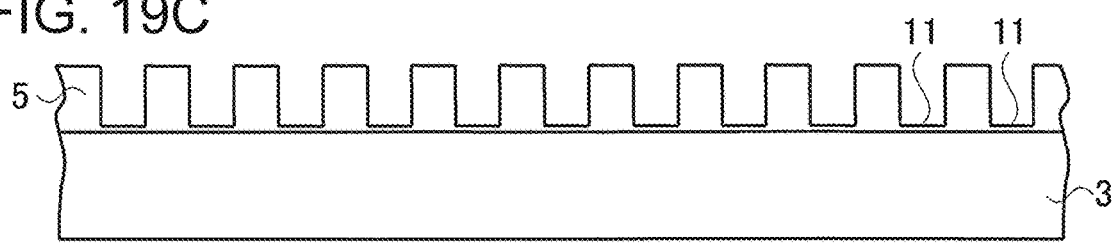
FIG. 19C
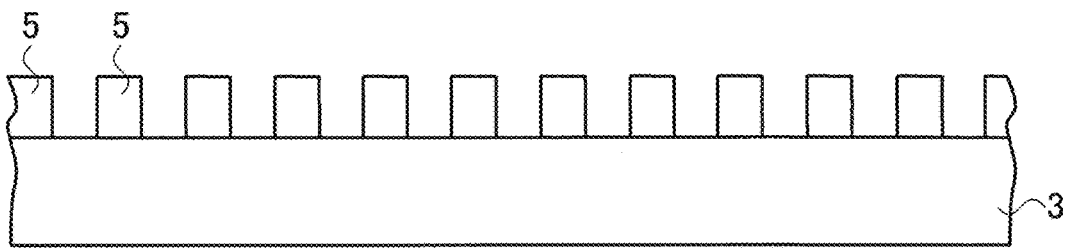
FIG. 19D
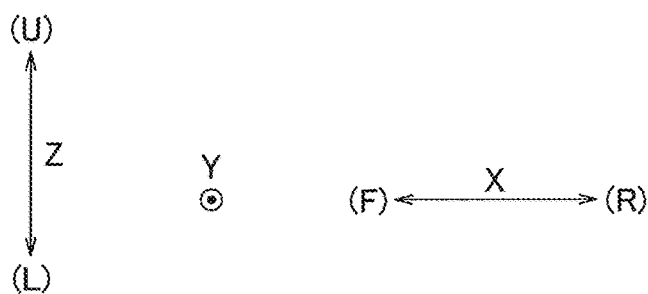

FIG. 20
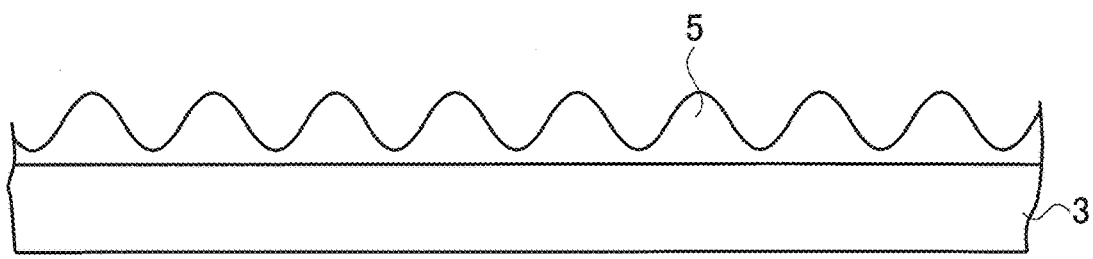
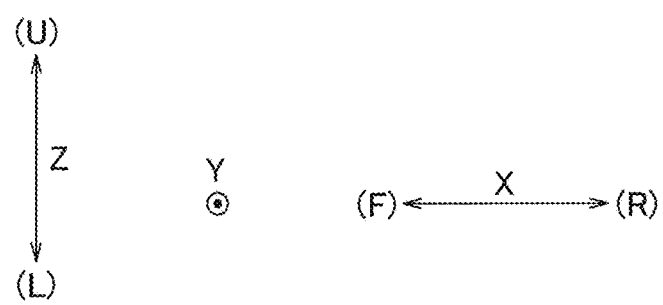

FIG. 21A
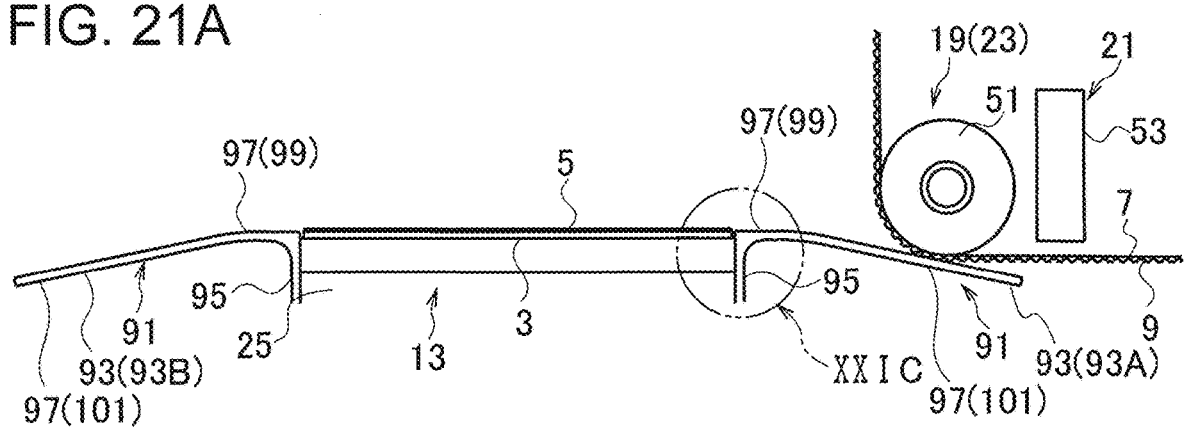
FIG. 21B
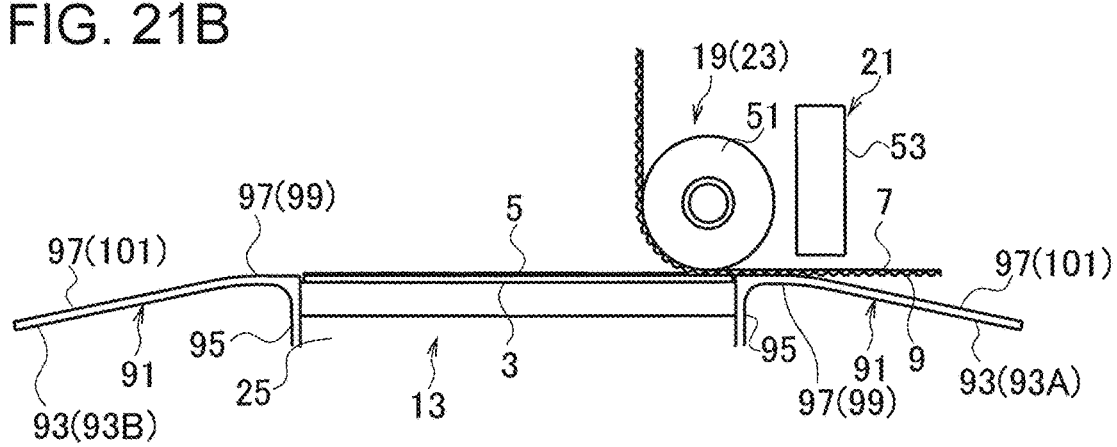
FIG. 21C
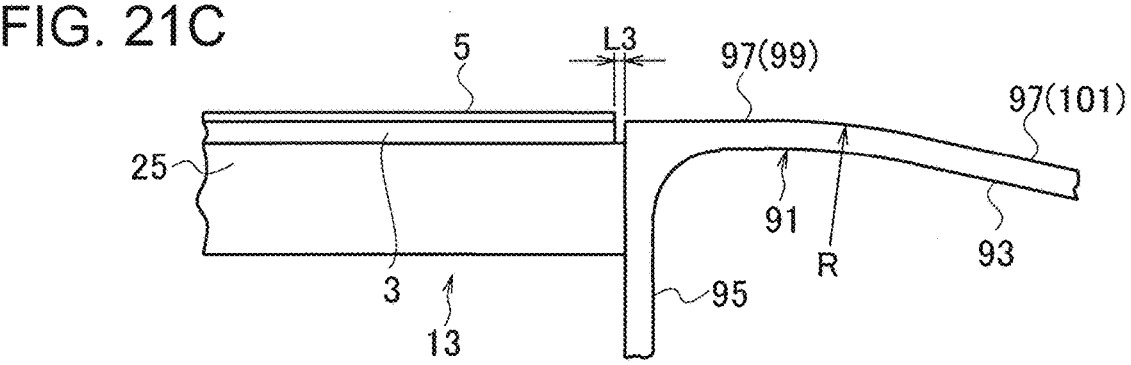
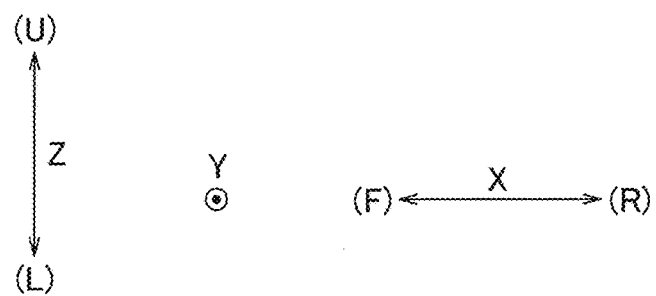

FIG. 22A
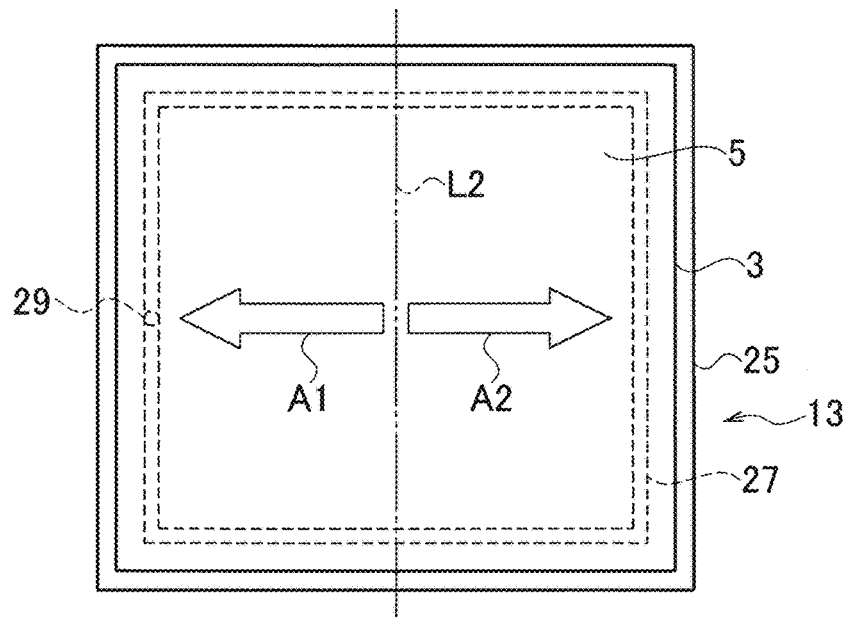
FIG. 22B
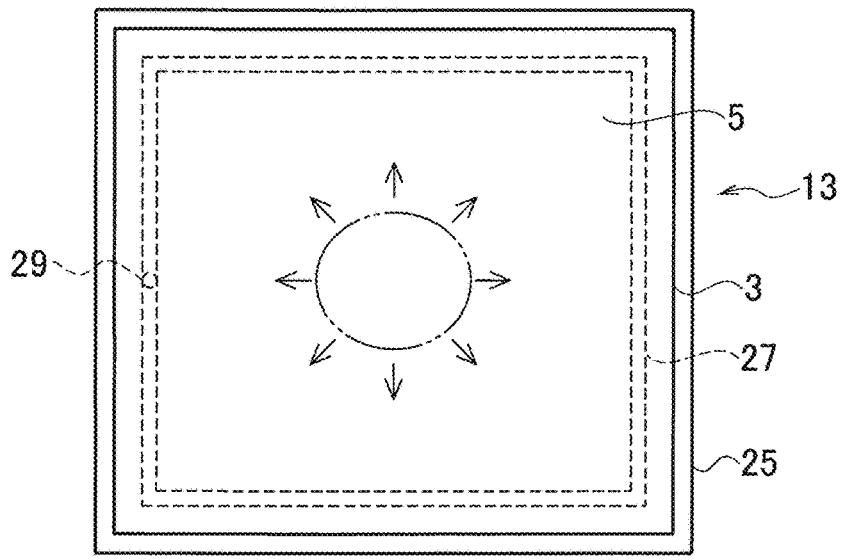
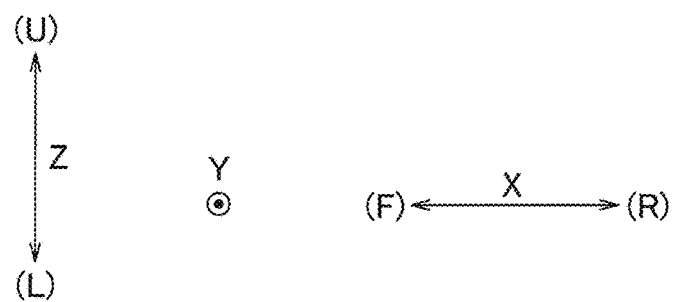

TRANSFER APPARATUS AND TRANSFER METHOD

CROSS REFERENCE TO RELATED APPLICATION

This application is based upon and claims the benefit of priority from Japanese Patent Application No. 2017-205740, filed Oct. 25, 2017, the disclosure of which is hereby incorporated by reference herein in its entirety.

FIELD

Embodiments described herein relate generally to a transfer apparatus and a transfer method, particularly, a transfer apparatus and a transfer method for transferring a fine transfer pattern formed on a mold to a resin coated on a substrate.

BACKGROUND

In a conventional example, there is known a transfer apparatus for transferring a fine transfer pattern formed on a mold to a resin coated on a substrate (see U.S. Pat. No. 9,604,402 B2). In the conventional transfer apparatus, the mold used for transfer extends between a rolled web mold and a winding roll.

In the conventional transfer apparatus, the mold is extended between the rolled web mold and the winding roll without using a device or an instrumental etc. but by manpower.

SUMMARY

In the conventional transfer apparatus, as the mold is installed without using a device or instrument etc. quite but using manpower, there is the question that the mold has be installed with difficulty.

For example, under condition of installing the mold by using neither a device nor an instrument etc. but only manpower, if the mold delivered and extended from the rolled web mold is twisted slightly, wrinkles may be generated in the mold, so that it becomes difficult to install the mold between the rolled web mold and the winding roll with accuracy.

In consideration of the above problem, an object of the present application is to provide a transfer apparatus and a transfer method for transferring a fine transfer pattern formed on a mold to a resin coated on a substrate, both of which allow the mold to be installed with accuracy and ease.

According to a first aspect of the present application, there is provided a transfer apparatus for transferring a fine transfer pattern formed on a mold to a resin coated on a substrate, including: a rolled web mold installation part configured to install a rolled web mold around which the mold is wound; a transfer roller configured to wind the mold fed out from the rolled web mold installed in the rolled web mold installation part, around the transfer roller; a winding roll configured to be capable of winding up the mold fed out from the rolled web mold installed in the rolled web mold installation part and also wound around the transfer roller; a winding roll installation part configured to install the winding roll therein; and a mold installation assisting part configured to perform to: wind the mold, which has been fed out from the rolled web mold installed in the rolled web mold installation part, around the transfer roller while suppressing an occurrence of wrinkles in a fed-out portion of the mold; and guide the mold up to the vicinity of the winding roll installed in the winding roll installation part.

The transfer apparatus may be constructed so that: a major portion of the mold on one end side thereof in a longitudinal direction before the mold is installed in the transfer apparatus may be is wound around a core material of the rolled web mold; a minor portion of the mold on the other end side thereof in the longitudinal direction before the mold is installed in the transfer apparatus is extended from the rolled web mold; a leading end of the mold extended from the rolled web mold is installed in a mold supporting part; the mold installation assisting part includes a mold installation assisting member which is freely movable in relation to all of the rolled web mold installation part, the transfer roller and the winding roll installation part; and the mold supporting part is installed in the mold installation assisting member.

The mold supporting part may be a core material of the winding roll.

According to a second aspect of the present application, there is also provided a transfer method for transferring a fine transfer pattern formed on a mold to a resin coated on a substrate, the transfer method including: installing a rolled web mold around which the mold is wound, in a rolled web mold installation part; winding the mold fed out from the rolled web mold installed in the rolled web mold installation part, around a transfer roller; installing an end of the mold, which has been fed out from the rolled web mold installed in the rolled web mold installation part and further wound around the transfer roller, in a winding roll installed in a winding roll installation part; winding the mold, which has been fed out from the rolled web mold installed in the rolled web mold installation part, around the transfer roller while suppressing an occurrence of wrinkles in a fed-out portion of the mold, after installing the rolled web mold in the rolled web mold installation part and when executing winding the mold around the transfer roller and installing the end of the mold in the winding roll; and guiding the mold up to the vicinity of the winding roll installed in the winding roll installation part with use of the mold installation assisting part.

The transfer method may be constructed so that: a major portion of the mold on one end side thereof in a longitudinal direction before installing the rolled web mold in the rolled web mold installation part may be wound around a core material of the rolled web mold; a minor portion of the mold on the other end side thereof in the longitudinal direction before installing the rolled web mold in the rolled web mold installation part is extends from the rolled web mold; a leading end of the mold extended from the rolled web mold is installed in a mold supporting part; the mold installation assisting part includes a mold installation assisting member which is freely movable in relation to all of the rolled web mold installation part, the transfer roller and the winding roll installation part; and the mold supporting part is installed in the mold installation assisting member.

Further, the mold supporting part may be a core material of the winding roll.

According to the first and second aspects of the present application, in the transfer apparatus and the transfer method for transferring the fine transfer pattern formed on the mold to the resin coated on the substrate, it is possible to facilitate the accurate installation of the mold in the transfer apparatus.

BRIEF DESCRIPTION OF THE DRAWINGS

FIGS. 19A to 19D are views illustrating the transfer operation of the transfer apparatus according to the embodiment.

FIG. 20 is a view illustrating the form of a resin in a modification, which has been coated at a coating part of the transfer apparatus according to the embodiment.

FIGS. 21A and 21B are views illustrating the arrangement where a transfer roller guide is provided in a substrate holding part in the transfer apparatus according to the embodiment, and FIG. 21C is an enlarged view of a part XXIC of FIG. 21A.

FIGS. 22A and 22B are views illustrating the hardening condition of a resin on a substrate installed on the substrate holding part of the transfer apparatus according to the embodiment.

DETAILED DESCRIPTION

Figure 1:
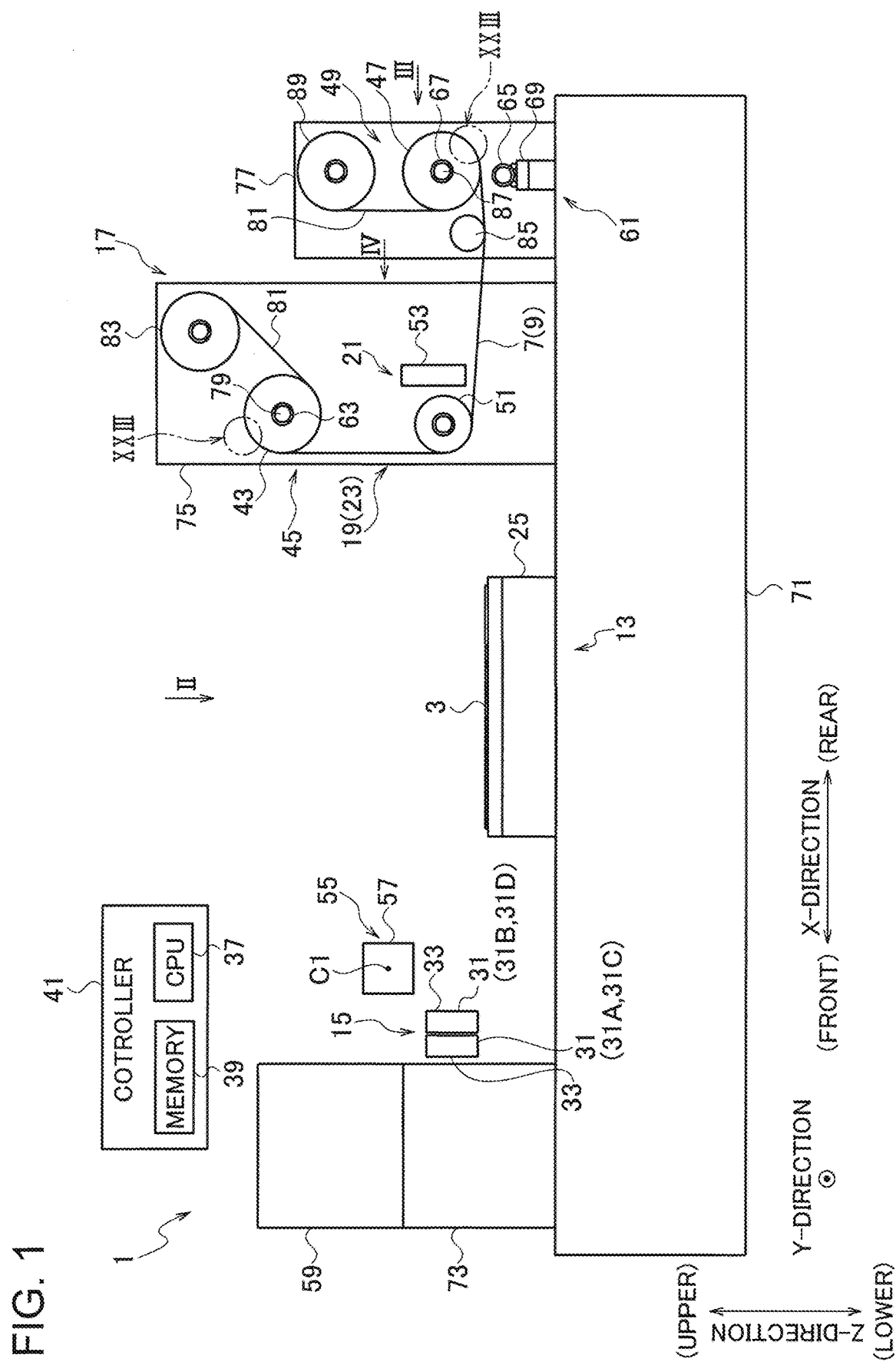
FIG. 1 is a view illustrating a schematic configuration of a transfer apparatus according to an embodiment.

A transfer apparatus according to an embodiment will be described with reference to FIGS. 1 to 23.

As will be obvious from FIGS. 19A to 19D, the transfer apparatus 1 according to the embodiment is provided to transfer a fine transfer pattern 9, which has been formed on a mold 7, to a thin film-like resin 5 coated on the upper surface of a substrate 3, for example.

We herein present, as the resin 5, a resin that is cured by electromagnetic waves in a predetermined wavelength, more specifically, an ultraviolet curing resin. Also, we present a substrate made of glass, PET resin, etc. as the substrate 3.

Also, the fine transfer pattern 9 is formed by, for example, repeated fine irregularities, as illustrated in FIG. 19B. In the irregularities, their dimensions of widths B1, B2 and height H1 are larger than or of the same level as the wavelength of the visible light, or smaller than the wavelength of the visible light, for instance, about a fraction of the wavelength of the visible light. In other words, the dimensions of widths B1, B2 and height H1 are about from a fraction of the wavelength of the visible light to several times the wavelength of the visible light. In addition, an aspect ratio of the irregularities (i.e. H1/B1 or H1/B2) is, for example, about 1 to 2.

For convenience of explanation, we now assume one predetermined horizontal direction as an X-direction, another predetermined horizontal direction orthogonal to the X-direction as a Y-direction, and a direction orthogonal to the X-direction and the Y-direction as a Z-direction (vertical direction). Furthermore, one side in the X-direction is defined as a front side, while the other side in the X-direction is defined as a rear side.

Here, the transfer operation will be described with reference to FIGS. 19A to 19D.

The transfer operation is carried out by first curing the resin 5 under condition that the mold 7 is being pressed against an uncured resin 5 on the substrate 3 and thereafter peeling off the mold 7 from the cured resin 5.

More specifically, it is first performed to press the mold 7 against the substrate 3 (see FIG. 19B) on which an uncured ultraviolet curing resin 5 in the form of a thin film is provided on a substrate upper surface (see FIG. 19A).

Under the condition of pressing the mold 7 against the substrate 3, the uncured ultraviolet curing resin 5 is filled in the transfer pattern 9 of the mold 7. It is noted in the condition illustrated in FIG. 19B, the leading end (lower end) of the transfer pattern 9 is slightly separated from the upper surface of the substrate 3, so that the uncured ultraviolet curing resin 5 (thickness: T1) enters between the transfer pattern 9 and the substrate 3. Preferably, the value of the thickness T1 is "0", however, this is extremely difficult.

Subsequently, in the condition illustrated in FIG. 19B, the uncured ultraviolet curing resin 5 is irradiated with ultraviolet light through at least one of the substrate 3 and the mold 7 to cure the ultraviolet curing resin 5.

Then, from the state illustrated in FIG. 19B, it is performed to peel off the mold 7 from the resin 5. As a result, there is remained the cured ultraviolet curing resin 5 on the substrate 3 (see FIG. 19C). On the cured ultraviolet curing resin 5, there is transferred the transfer pattern 9 having a predetermined configuration (pattern).

In the condition illustrated in FIG. 19C, a residual film 11 is present on the substrate 3. The residual film 11 results from curing of the resin 5 of thickness T1 illustrated in FIG. 19B.

In the structure illustrated in FIG. 19C, then, it is performed to remove the residual film 11 by aching. Consequently, with the removal of the residual film 11, there is obtained a condition illustrated with FIG. 19D where the upper surface of the substrate 3 is partially exposed on the upside of the substrate 3.

As illustrated in FIG. 1 and the like, the transfer apparatus 1 includes a substrate installation part 13, a coating part 15, a mold installation part 17, a mold pressing part 19, a resin curing part 21, and a mold peeling part 23.

In the substrate installation part 13, the substrate 3 is positioned and installed integrally with the substrate 3. The coating part 15 is adapted so as to coat the uncured ultraviolet curing resin 5 on the upper surface of the substrate 3 installed on the substrate installation part 13. Since the coating part 15 applies the uncured ultraviolet curing resin 5 on the substrate 3, there is obtained an arrangement illustrated in FIG. 19A.

In the mold installation part 17, there is installed a sheet-like mold 7 having the transfer pattern 9 arranged on one surface in the thickness direction.

The mold pressing part 19 performs to press the mold 7 installed in the mold installation part 17 against the uncured ultraviolet curing resin 5 on the upper surface of the substrate 3. With the mold pressing part 19 pressing the mold 7 against the ultraviolet curing resin 5 of the substrate 3, there is realized a situation illustrated in FIGS. 19B and 18C.

The resin curing part 21 performs to cure the uncured ultraviolet curing resin 5 against which the mold 7 is pressed. The mold peeling part 23 performs to peel off the mold 7 from the cured resin 5. With the mold 5 peeled off from the cured resin 5, there is realized a situation illustrated in FIG. 19C.

As illustrated in FIGS. 1, 22, and the like, the substrate installation part 13 includes a substrate installation body 25 and holds the substrate 3, for example, by means of vacuum sucking. The substrate installation body 25 is formed, on its upper surface (for example, a rectangular planar upper surface), with a loop (for example, rectangular) groove 27 for vacuum sucking. The groove 27 is formed by a portion recessed from the upper surface of the substrate placement body 25.

The groove 27 is provided with an air suction hole 29 for sucking air. The air suction hole 29 is connected to a vacuum pump (not illustrated) on the underside of the substrate placement body 25. The substrate 3 installed in the substrate installation part 13 has a thickness direction identical to the vertical direction, so that the bottom surface of the substrate 3 is in surface contact with the top surface of the substrate installation body 25.

As illustrated in FIGS. 22A and 22B, when viewing the substrate 3 in the form of a rectangular flat plate installed in the substrate installation part 13 in the Z-direction, the substrate 3 is positioned inside the substrate installation body 25, and the groove 27 is located inside the substrate 3. The groove 27 is positioned in the vicinity of the outer circumference of the substrate 3.

Then, by lowering the air pressure in the groove 27, the substrate 3 is secured to the substrate installation body 25. In this state, as the air pressure is almost "0" at the inside (rectangular portion) of the groove 27 when viewed from the Z-direction, the substrate 3 is held with a relatively strong force.

The coating part 15 discharges the uncured ultraviolet curing resin 5 in the form of fine particles from an inkjet head 31 to form a thin film of the uncured ultraviolet curing resin 5 on the substrate 3 installed in the substrate installation part 13. The inkjet head 31 includes a plurality of juxtaposed nozzles for discharging the uncured ultraviolet curing resin 5 in the form of fine particles. The inkjet head 31 is slightly separated from the substrate 3 while being located above the substrate 3 installed in the substrate installation part 13.

Figure 5:
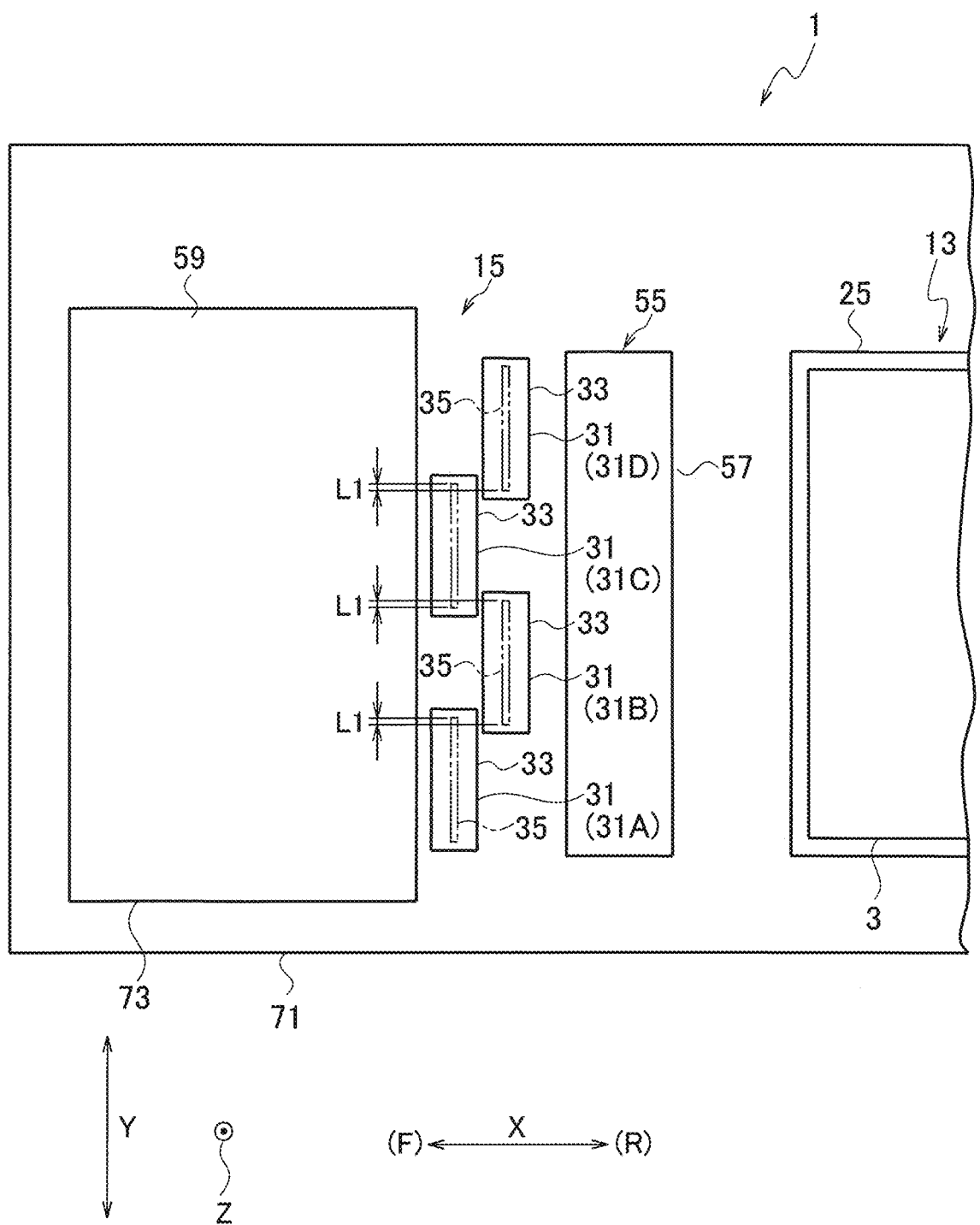
FIG. 5 is an enlarged view of a part V of FIG. 2.
Figure 6:
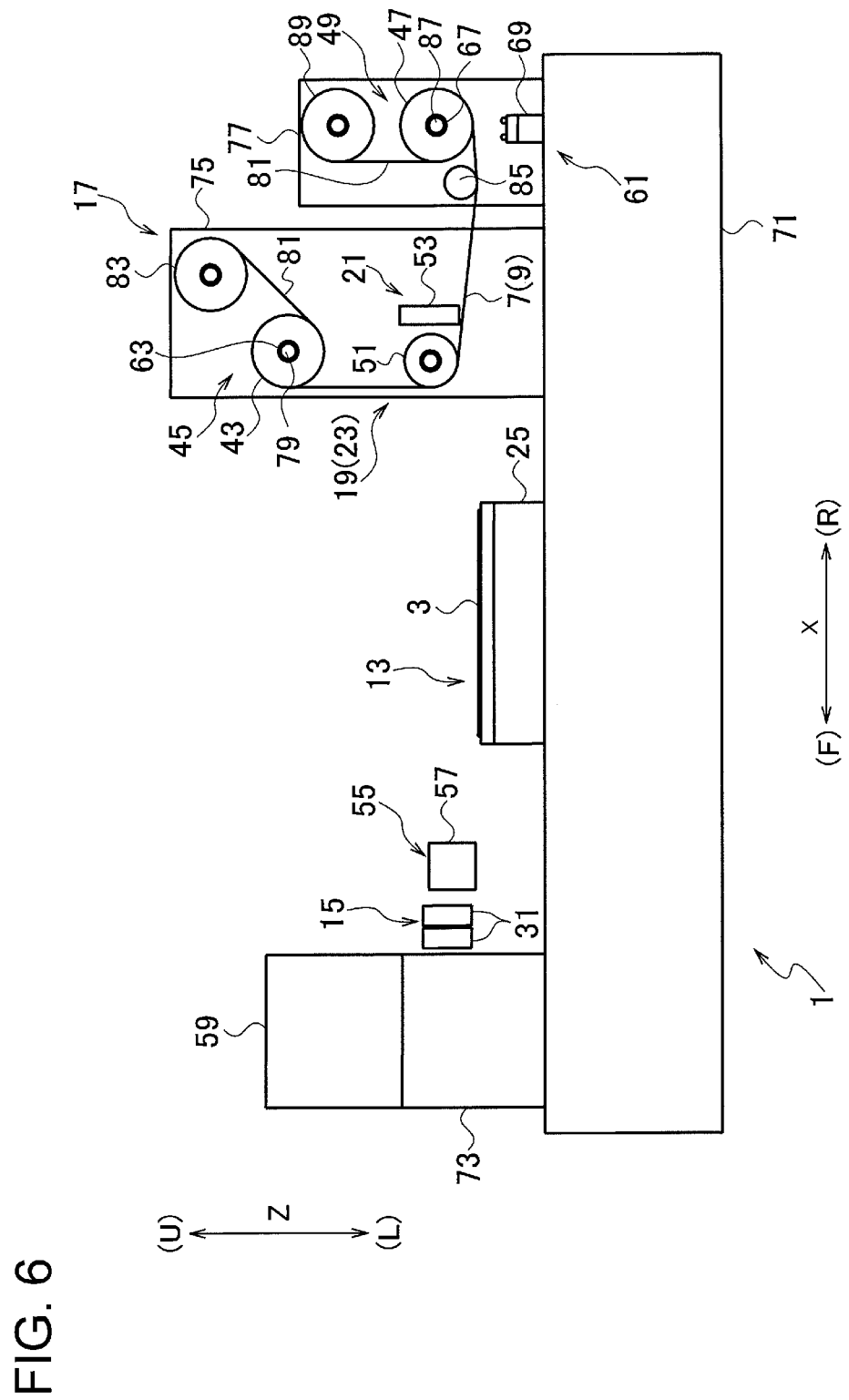
FIG. 6 is a view illustrating the operation of the transfer apparatus according to the embodiment.
Figure 7:
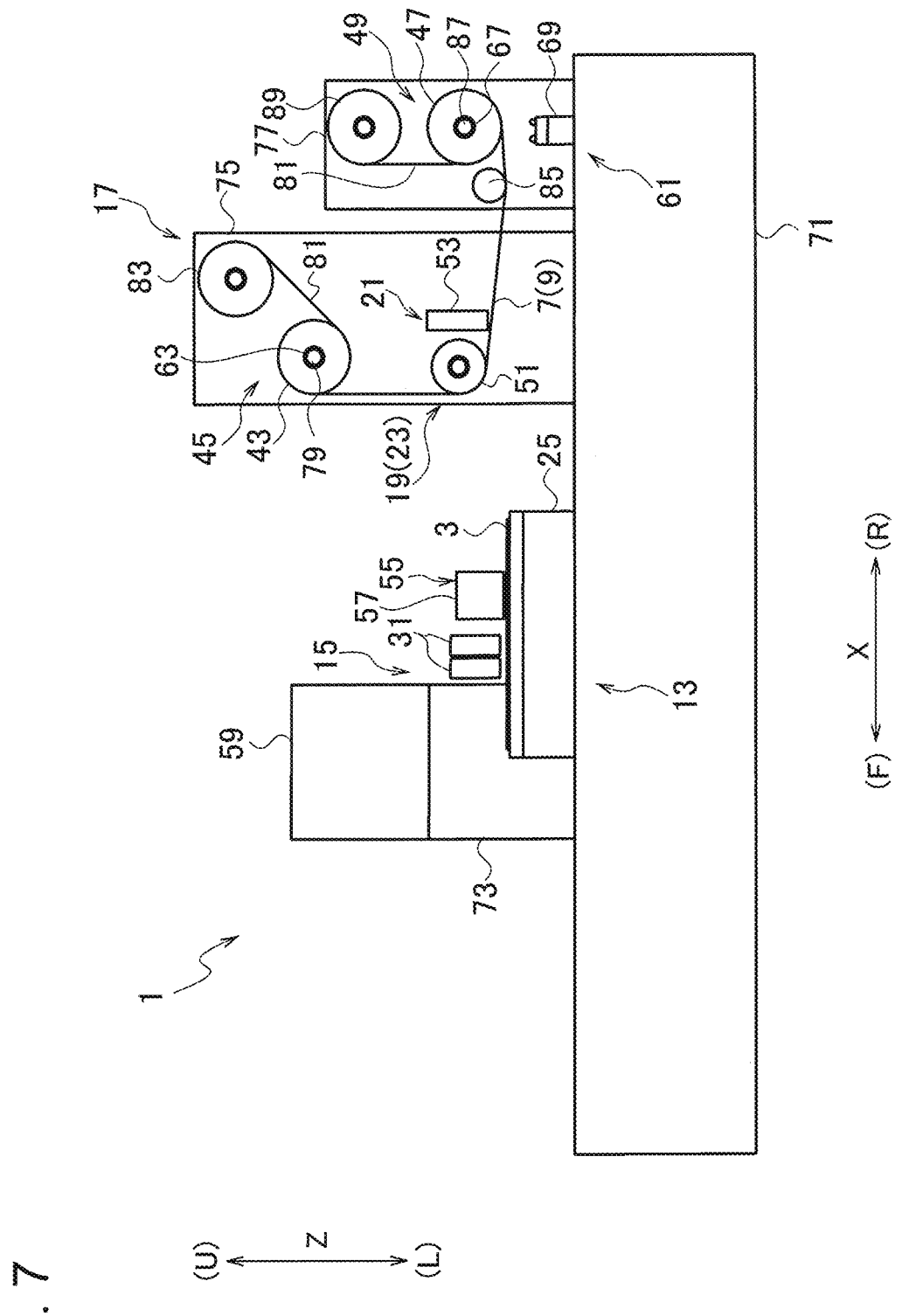
FIG. 7 is a view illustrating the operation of the transfer apparatus according to the embodiment.

The inkjet head 31 is composed of a plurality of inkjet heads (31A, 31B, 31C and 31D). In order to allow the substrate 3 in the substrate installation part 13 to be coated with the uncured ultraviolet curing resin 5 having a pattern as a target, the respective inkjet heads 31 are arranged in a staggered manner, as illustrated in FIG. 5 and the like.

When the situation where the uncured ultraviolet curing resin 5 coated on the substrate 3 exhibits a target pattern is viewed in the Z-direction, it is seen that the uncured ultraviolet curing resin 5 is formed into, for example, a rectangular shape slightly smaller than the substrate 3 and also positioned inside the substrate 3 although it is not illustrated in the figure. In connection, the substrate 3 may be provided, on its entire upper surface, with the uncured ultraviolet curing resin 5.

Additionally, the arrangement of the inkjet heads 31 (31A, 31B, 31C, and 31D) in a staggered manner prevents voids from being formed in the coated uncured ultraviolet curing resin 5.

That is, it is prevented that, in view of the Z-direction, the uncured ultraviolet curing resin 5 is absent in part of the upper surface of the substrate 3 (for example, a central portion of the substrate 3; the portion surrounded by the uncured ultraviolet curing resin 5), thereby causing the substrate 3 to be exposed (namely, it is prevented that the uncured ultraviolet curing resin 5 does not form a targeted pattern).

Or, it is prevented that the uncured ultraviolet curing resin 5 which originally ought to form one continuous target pattern is divided into two or more portions (namely, it is prevented that the uncured ultraviolet curing resin 5 does not form a target pattern).

A casing 33 of each inkjet head 31 is formed into a rectangular parallelepiped shape, and its dimension in the Y-direction is larger than the dimension in the X-direction. The inkjet head 31 is adapted so as to discharge the uncured ultraviolet curing resin 5 from the bottom surface of the casing 33 toward the lower side.

In each inkjet head 31, as illustrated in FIG. 5, a resin discharging portion 35 for discharging the resin 5 is formed into an elongated rectangular shape. In view of the Z-direction, the resin discharging portion 35 has its longitudinal direction identical to the Y-direction. Inside the casing 33 of the inkjet head 31, the resin discharging portion 35 is located in a central portion of the casing 33.

The respective inkjet heads 31 (31A, 31B, 31C, and 31D) are aligned in the Y-direction and also shifted from each other in the X-direction alternately. In arrangement, one inkjet head 31 and the adjacent inkjet head 31 are arranged so that a longitudinal end of the resin discharging portion 35 of the former inkjet head 31 overlaps the other longitudinal end of the resin discharging portion 35 of the latter (adjacent) inkjet head 31 (see a portion of L1 in FIG. 5).

More specifically, the first inkjet head 31A positioned at one end in the Y-direction is arranged so that the longitudinal direction of the resin discharging portion 35 (or the casing 33 of the inkjet head) coincides with the Y-direction. Also, the second inkjet head 31B adjacent to the first inkjet head 31A is arranged so that the longitudinal direction of the resin discharging portion 35 coincides with the Y-direction and slightly departs from the first inkjet head 31A to the rear side in the X-direction.

In view of the Z-direction, it is obvious that the resin discharging portion 35 of the first inkjet head 31A and the resin discharging portion 35 of the second inkjet head 31B are slightly separated from each other in the X-direction and additionally, one end of the resin discharging portion 35 of the first inkjet head 31A (one end: on the side of the second inkjet head 31B) and one end portion of the resin discharging portion 35 of the second inkjet head 31B (one end: on the side of the first inkjet head 31A) overlap each other in the Y-direction.

The third inkjet head 31C adjacent to the second inkjet head 31B is arranged so that the longitudinal direction of the resin discharging portion 35 coincides with the Y-direction and departs from the second inkjet head 31B slightly in the X-direction. Also in the X-direction, the third inkjet head 31C is located at the same position as the first inkjet head 31A.

Again, in view of the Z-direction, it is obvious that the resin discharging portion 35 of the second inkjet head 31B and the resin discharging portion 35 of the third inkjet head 31C are slightly separated from each other in the X-direction. Also in the Y-direction, one end of the resin discharging portion 35 of the second inkjet head 31B (one end: on the side of the third inkjet head 31C) and one end portion of the resin discharging portion 35 of the third inkjet head 31C (one end: on the side of the second inkjet head 31B) overlap each other. The fourth inkjet head 31D is also arranged in the above-described manner.

With the above-mentioned arrangement of the respective inkjet heads 31 (31A, 31B, 31C, and 31D), they are arranged in a staggered manner. It is noted that they are inkjet heads of, for example, the same specification and are positioned at the same level in the Z-direction.

In the above-mentioned arrangement, the coating part 15 is provided with four inkjet heads 31. Alternatively, it may be provided with two or three inkjet heads 31. Further, the coating part 15 may be provided with five or more inkjet heads 31. Also in this case, the respective inkjet heads 31 are arranged in a staggered manner.

With the arrangement of the inkjet heads 31 in a staggered manner, when each of the inkjet heads 31 is moved relatively to the substrate 3 installed in the substrate installation part 13 in the X-direction while discharging the uncured ultraviolet curing resin 5 through the inkjet heads 31, the substrate 3 can be easily coated with coat the ultraviolet curing resin 5 in the form of a thin film without producing any interruption.

Under control of a control unit 41 (see FIG. 1) including a CPU 37 and a memory 39, it may be executed to establish one or more inkjet heads 31 for ejecting the uncured ultraviolet curing resin 5 and one or more inkjet heads 31 that do not eject the uncured ultraviolet curing resin 5 in accordance with the size of the substrate 3 (e.g. a substrate's dimension in the Y-direction) installed in the substrate installation part 13.

In the above description, the uncured ultraviolet curing resin 5 is applied on the substrate 3 with a constant thickness. Nevertheless, the uncured ultraviolet curing resin 5 may be applied on the substrate 3 with an appropriately-varying thickness, as illustrated in FIG. 20, That is, with the coating part 15 controlled in operation by the control unit 41, the uncured ultraviolet curing resin 5 may be applied to the substrate 3 with a pattern corresponding to (or similar to) the fine transfer pattern 9 formed on the mold 7.

More specifically, in advance of transferring a fine transfer pattern 9 formed on the mold 7 to the uncured ultraviolet curing resin 5 applied to the substrate 3, the ultraviolet curing resin 5 may be formed into a shape corresponding to the fine transfer pattern 9 in order to reduce a gap produced between the leading end of the transfer pattern 9 and substrate 3, thereby thinning the residual film 11 formed by the resin 5 entering this gap.

When explanation is made by an example, the fine transfer pattern 9 is formed into a line-and-space shape. That is, in view of the Y-direction, the fine transfer pattern 9 has a rectangular wave shape where rectangular projections and rectangular recesses are repeated alternately (see FIG. 19B). In this case, the uncured ultraviolet curing resin 5 coated on the substrate 3 is formed into a corrugated shape.

In view of the Y-direction, for example, the uncured ultraviolet curing resin 5 is formed in a waveform shape where thickly coated portions and thinly coated portions are repeated alternately, as illustrated in FIG. 20. In this waveform shape, for example, the pitch of the wave is set larger than the wave height (i.e. a difference between the maximum thickness and the minimum thickness of the resin 5) and additionally, the wave height is larger than the minimum thickness of the resin 5.

When transferring in the above-mentioned arrangement of the uncured ultraviolet curing resin 5, the mold 7 is pressed against the resin 5 so that the rectangular convex portions of the transfer pattern 9 enter into the thinly coated portions of the resin 5, while the thickly coated portions of the resin 5 enter into the rectangular concave portions of the transfer pattern 9.

By coating the uncured ultraviolet curing resin 5 as illustrated in FIG. 20, it is possible to reduce the residual film 11 illustrated in FIG. 19C.

In the modification, additionally, the thickness of the uncured ultraviolet curing resin 5 applied to the substrate 3 before the transfer operation may be changed in the X-direction. For example, in order to eliminate or reduce the surplus resin at the end of transfer (i.e. when the pressing of the mold 7 against the resin 5 on the substrate 3 is completed), the uncured ultraviolet curing resin 5 may be formed to be thick on one substrate side where the pressing is started (i.e. the right side of FIGS. 19A and 18A) while the resin 5 is formed to be thin on the other substrate's side where the pressing is ended (i.e. the left side of FIGS. 19A and 18A). The details of roll-transferring illustrated in FIGS. 18A to 18C will be described later.

Alternatively, the thickness of the uncured ultraviolet curing resin 5 applied to the substrate 3 before the transfer operation may be changed in the Y-direction. For example, in order to avoid the shortage of the resin 5 at the central portion of the substrate 3 during the transfer operation, the resin 5 may be formed so that its thickness becomes thick at the central portion of the substrate 3 in the Y-direction and also becomes thin at the marginal portions of the substrate 3 in the Y-direction.

Next, the mold installation part 17, the mold pressing part 19, and the mold peeling part 23 of the transfer apparatus will be described.

Figure 2:
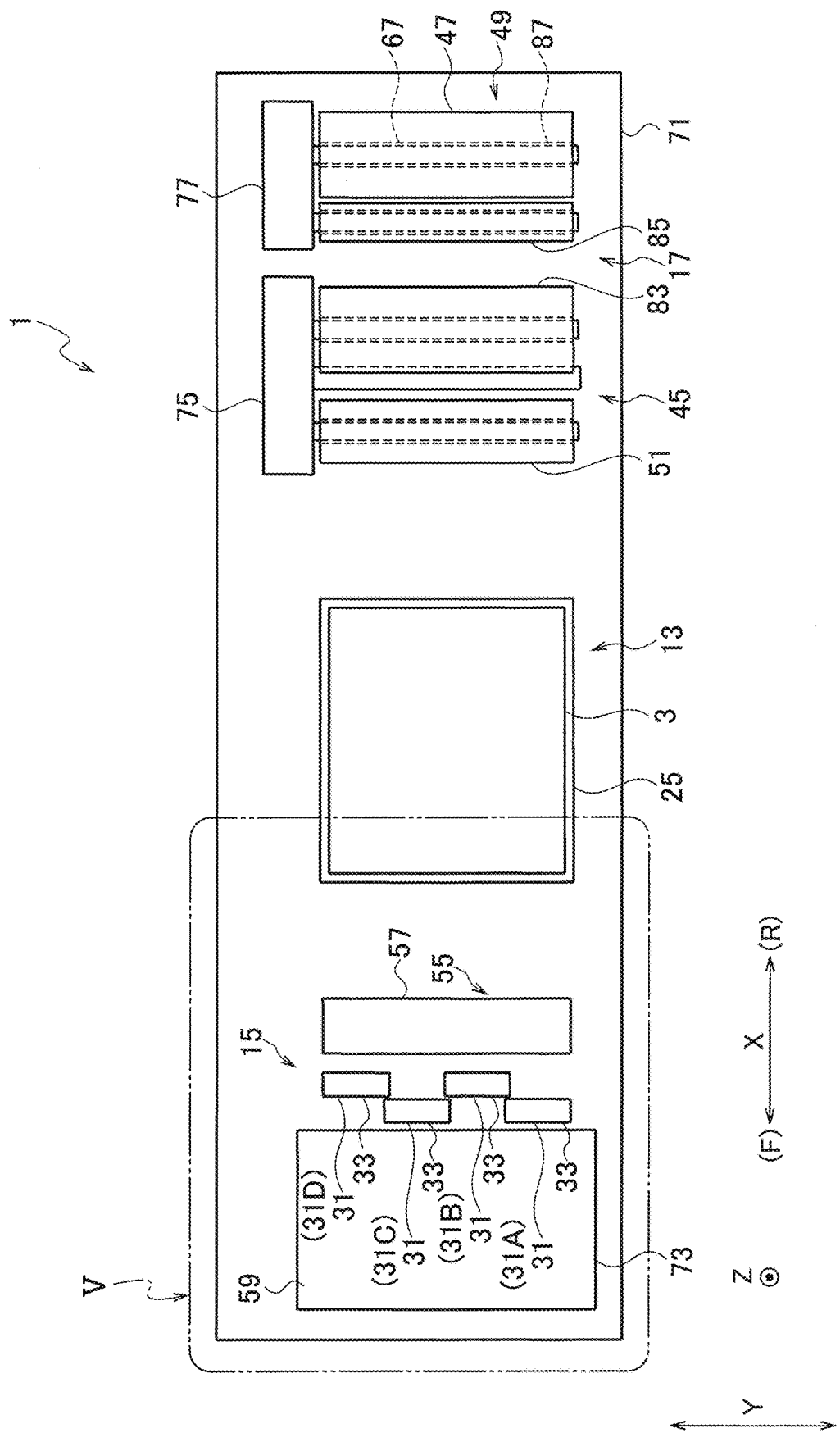
FIG. 2 is a view as viewed in the direction of an arrow II of FIG. 1.
Figure 3:
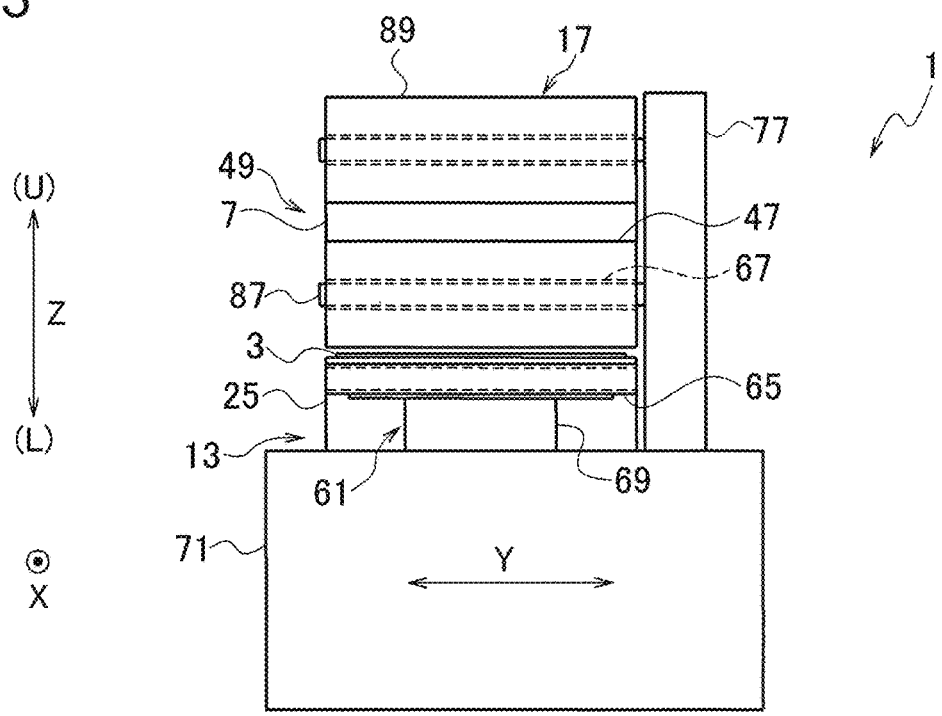
FIG. 3 is a view as viewed in the direction of an arrow III of FIG. 1.
Figure 4:
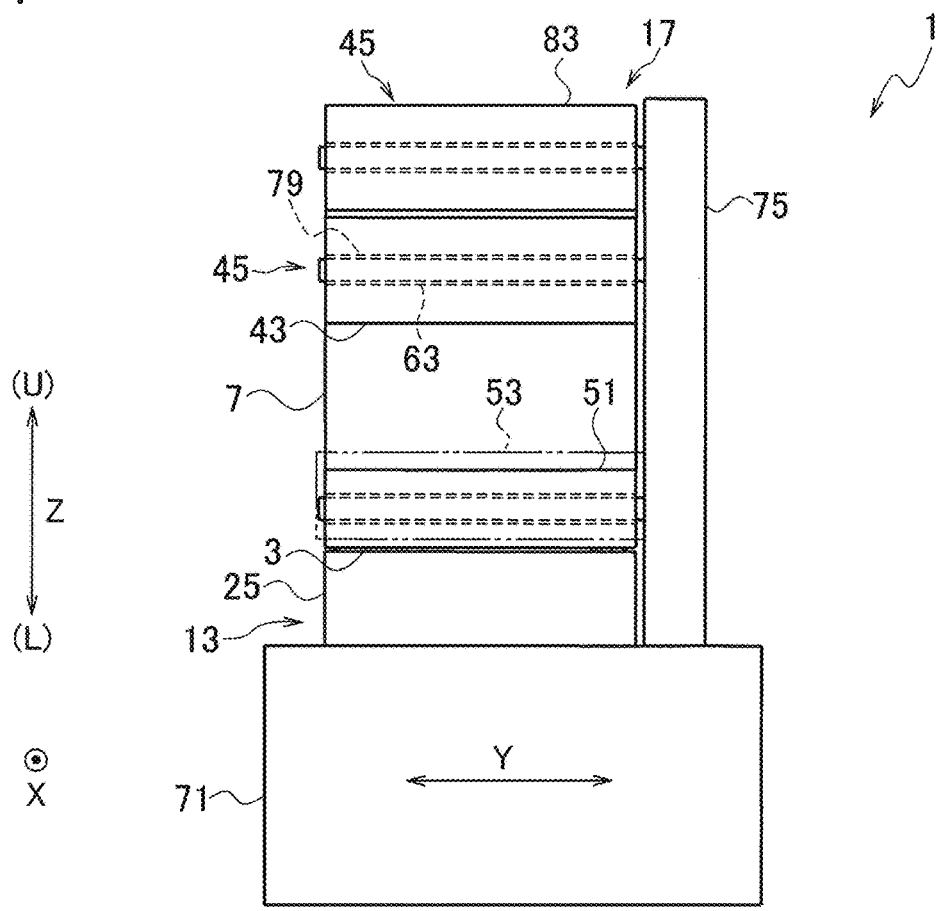
FIG. 4 is a view as viewed in the direction of an arrow IV of FIG. 1.

As illustrated in FIGS. 2 to 4, the mold installation part 17 includes a rolled web mold installation part (delivering roll installation part) 45 for installing a rolled web mold (web roll) 43 around which the elongated mold 7 having a predetermined width (in the Y-direction) is wound, and a winding roll installation part 49 for installing a winding roll 47 for winding up the mold 7 fed out from the rolled web mold (web roll) 43 installed in the rolled web mold installation part 45. Incidentally, FIG. 2 intentionally omits the mold 7 in view of avoiding respective components from being difficult to be seen for their complexity.

Between the rolled web mold 43 installed in the rolled web mold installation part 45 and the winding roll 47 installed in the winding roll installation part 49, the mold 7 is stretched with a predetermined tension. As a result, in this segment, the mold 7 always extends in the form of a flat plate having no slackening.

With the appropriate rotation of the rolled web mold 43 and the winding roll 47, the mold 7 extending between the rolled web mold 43 and the winding roll 47 moves from the rolled web mold 43 to the winding roll 47 while maintain its state producing no slackening, and conversely, moves from the winding roll 47 to the rolled web mold 43.

As illustrated in FIGS. 1, 2, and 18A to 18C, the mold pressing part 19 and the mold peeling part 23 include a transfer roller 51. Wound around this transfer roller 51 is the mold 7 that extends between the rolled web mold 43 installed in the rolled web mold installation part 45 and the winding roll 47 installed in the winding roll installation part 49.

By the roll-transferring using the transfer roller 51, it is performed to press the mold 7 against the uncured ultraviolet curing resin 5 and subsequently peel off the mold 7 from the cured ultraviolet curing resin 5, in the transfer operation.

Figure 18A:
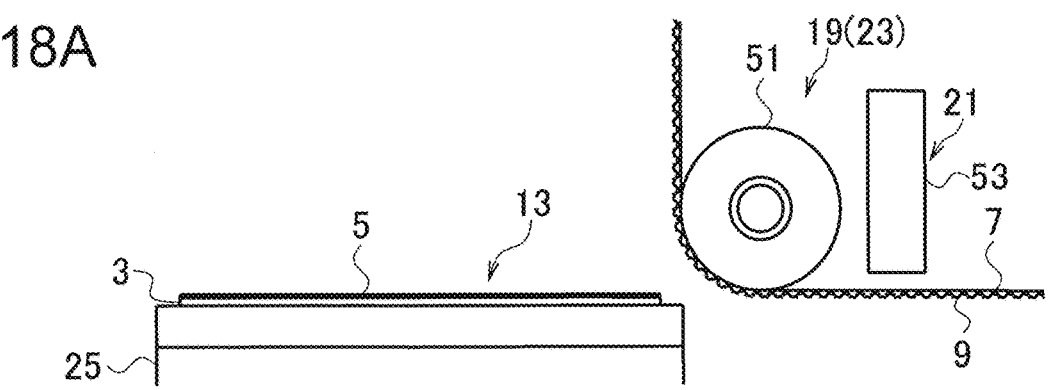
FIGS. 18A to 18C are views illustrating the operation of a transfer roller and the like of the transfer apparatus according to the embodiment.
Figure 18B:
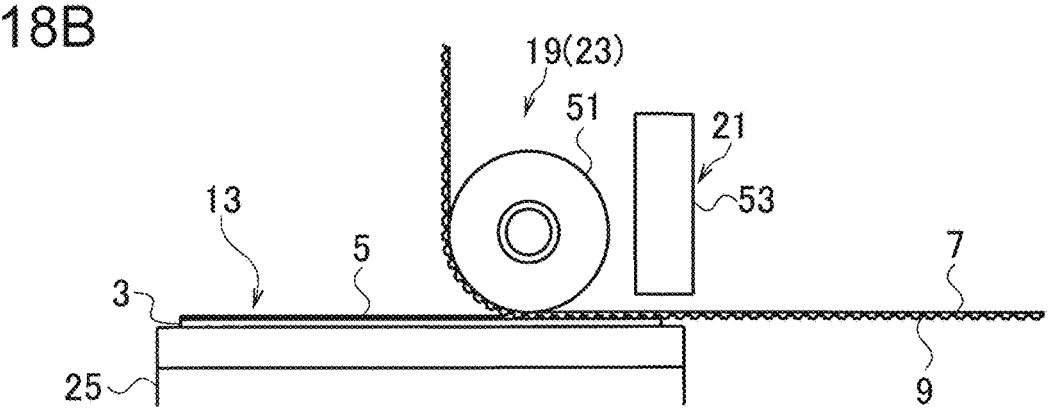
Figure 18C:
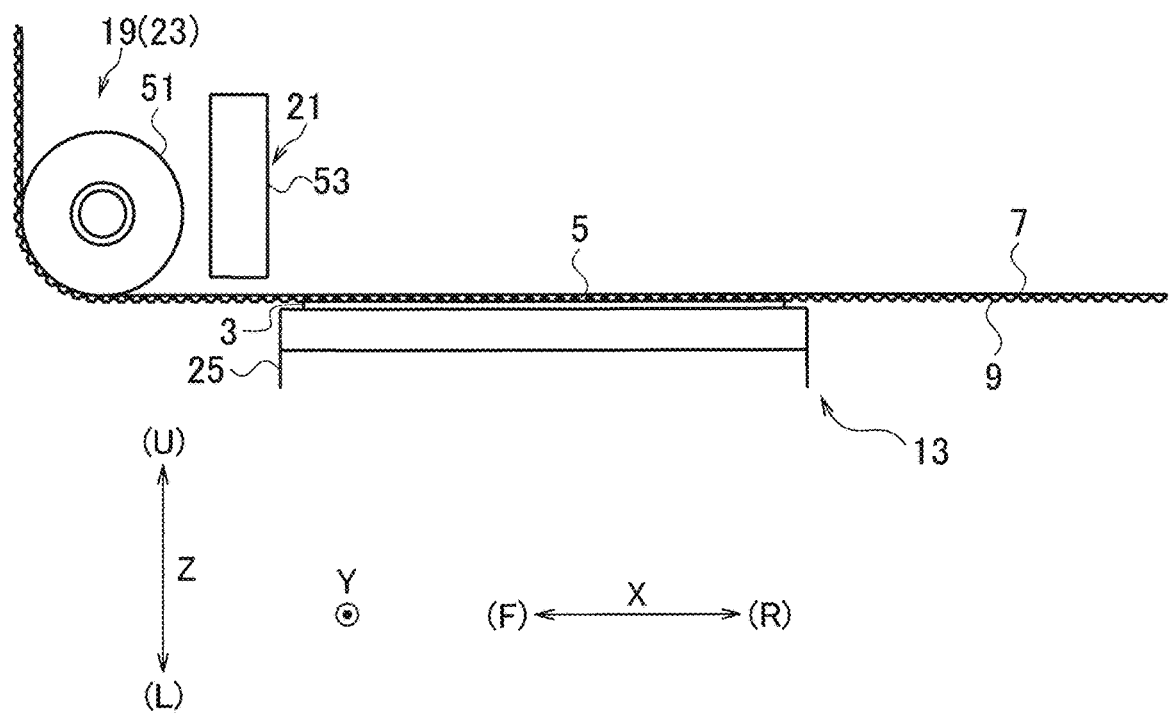

The roll-transferring is accomplished by moving the transfer roller 51 relatively to the substrate 3 from its one end (rear end) toward the other end (front end) in the X-direction while pressing the mold 7 against the substrate 3 and the uncured ultraviolet curing resin 5 in the form of a thin film coated on the substrate 3 by the use of the transfer roller 51 around which the mold 7 is wound (see FIGS. 18A to 18C).

More specifically, with the movement of the transfer roller 51(around which the mold 7 is wound) in relation to the substrate 3 (installed in the substrate installation part 13) to the front side in the X-direction (the left side of FIG. 18A) at a constant speed, the situation of the transfer apparatus is changed from the state of FIG. 18A to the state of FIG. 18C through the state of FIG. 18B, so that the pressing of the mold 7 is completed.

After curing the ultraviolet curing resin 5 with the resin curing part 21 in the state of FIG. 18C, it is performed to move the transfer roller 51 (around which the mold 7 is wound) in relation to the substrate 3 (installed in the substrate installation part 13) to the rear side in the X-direction (the right side of FIG. 18C), for example, at a constant speed. In this way, the peeling of the mold 7 is completed.

At this time, the transfer roller 51 is urged toward the substrate 3 (i.e. the lower side) by an actuator (not illustrated) such as a pneumatic cylinder. Further, regardless of the position of the transfer roller 51 brought by the movement of the transfer roller 51, the mold 7 extends between the rolled web mold 43 installed in the rolled web mold installation part 45 and the winding roll 47 installed in the winding roll installation part 49, in the form of a flat plate having no slackening.

As illustrated in FIGS. 1, 18, and the like, the transfer apparatus 1 is provided with the resin curing part 21 (for example, an ultraviolet ray generator 53). Under the condition of pressing the mold 7 against the ultraviolet curing resin 5, the ultraviolet ray generator 53 irradiates the ultraviolet curing resin 5 with ultraviolet light to cure the ultraviolet curing resin 5.

The ultraviolet ray generator 53 is located slightly away from the transfer roller 51 on the rear side of the transfer roller 51 in the X-direction. In the Z-direction, the ultraviolet ray generator 53 is positioned above the mold 7 extending in the X-direction on the rear side of the transfer roller 51 and also located slightly away from the mold 7.

Then, the ultraviolet ray generator 53 generates ultraviolet rays downward. As a result, the so-generated ultraviolet rays are irradiated onto the ultraviolet curing resin 5 on the substrate 3 through the mold 7.

When viewing an area of ultraviolet rays generated from the ultraviolet ray generator 53 in the Z-direction, the area of ultraviolet rays is seen so as to extend long in the Y-direction (not illustrated). As a result, with the movement of the ultraviolet ray generator 53 in relation to the substrate 3 installed in the substrate installation part 13 in the X-direction, all of the ultraviolet curing resin 5 on the substrate 3 (i.e. resinous part against which the transfer pattern 9 is pressed) is cured.

Further, in the transferring apparatus 1, when the transfer roller 51 is moving in the direction (forward direction) to press the mold 7 against the ultraviolet curing resin 5 under control of the control unit 41 and when the transfer roller 51 is moving in the direction (backward direction) to peel off the mold 7 from the resin 5, the ultraviolet ray generator 53 irradiates the ultraviolet curing resin 5 with ultraviolet rays.

That is, during the roll-transferring operation, when the transfer roller 51 is moving (pressing the mold 7) in the direction (front side) to increase the pressing area of the mold 7 against the ultraviolet curing resin 5 (i.e. when the resin 5 is pressed by mold 7) and when the transfer roller 51 is moving in the direction (rear side) to decrease the pressing area of the mold 7 against the ultraviolet curing resin 5 (i.e. when the mold 7 is peeled off from the resin 5), the ultraviolet ray generator 53 irradiates the ultraviolet curing resin 5 with ultraviolet rays.

In other words, when the transfer roller 51 reciprocates, the ultraviolet ray generator 5 irradiates the ultraviolet curing resin 5 with ultraviolet rays. In connection, the ultraviolet ray generator 53 may be configured so as to irradiate the ultraviolet curing resin 5 with ultraviolet rays only when the transfer roller 51 is moving to the front side or when the transfer roller 51 is moving to the rear side.

In order to prevent sink marks from occurring in the ultraviolet curing resin 5, the transfer apparatus 1 is constructed so that the control unit 41 adjusts the intensity of ultraviolet rays (i.e. altering of the irradiation pattern) emitted from the ultraviolet ray generator 53 to the ultraviolet curing resin 5 in accordance with the displacement of the transfer roller 51 during the roll-transferring operation.

For instance, as illustrated in FIG. 22A, when pressing the mold 7 against the resin 5, the irradiation of ultraviolet rays may be started from a point of time of passing through a center line L2 (on the front side of the center line L2 as illustrated with an arrow A1), and when peeling off the mold 7 from the resin 5, the irradiation of ultraviolet rays may be started from a point of time of passing through the center line L2 (on the rear side of the center line L2 as illustrated with an arrow A2). Consequently, since there is no possibility that the central portion of the ultraviolet curing resin 5 is not cured at the end, the occurrence of sink marks in the ultraviolet curing resin 5 is prevented.

In this case, the intensity of ultraviolet rays is constant irrespective of passage of time (regardless of the position of the transfer roller 51 in the X-direction) and furthermore, the intensity of ultraviolet rays is also constant irrespective of the position of the transfer roller 51 in the Y-direction (i.e. the position of the ultraviolet ray area by the ultraviolet ray generator 53 in the longitudinal direction). Incidentally, the center line L2 may be biased to either the left or the right of FIG. 22A.

Further, by appropriately changing the intensity of ultraviolet rays in the Y-direction or in accordance with the position of the ultraviolet ray generator 53 in the X-direction, it may be executed to cause the ultraviolet curing resin 5 to be cured from the central portion of the substrate 3 toward the outside, as illustrated in FIG. 22B.

Also, the transfer apparatus 1 is provided with a plasma unit 55. The plasma unit 55 irradiates plasma onto the fine transfer pattern 9 provided on the mold 7 peeled off from the resin 5 of the substrate 3 after transferring. Incidentally, the plasma irradiation by the plasma unit 55 is performed to clean the fine transfer pattern 9 provided on the mold 7.

The plasma unit 55 includes a head 57 and a driver 59. Then, atmospheric pressure plasma (AP plasma) is generated from the head 57, and the generated atmospheric pressure plasma is irradiated to the mold 7 to decompose and remove contamination of the fine transfer pattern 9 and the like of the mold 7.

The irradiation of plasma to the mold 7 may be performed each time when one transfer operation is completed or may be performed each time when plural transfer operations are completed.

In the transfer apparatus 1, if the fine transfer pattern 9 of the mold 7 is cleaned by the plasma unit 55 insufficiently, a portion of the mold 7 peeled off from the ultraviolet curing resin 5 and irradiated with plasma is wound up by the winding roll 47, while a new unused portion of the mold 7 is unwound from the rolled web mold 43. The newly-delivered unused portion of the mold 7 is used for the next transfer operation.

By the plasma unit 55, plasma is also irradiated on the upper surface of the substrate 3 before the uncured ultraviolet curable resin 5 is installed. The plasma irradiation on the upper surface of the substrate 3 is performed to improve the wettability of the substrate 3.

The coating part 15 is configured so as to coat the uncured ultraviolet curing resin 5 in the form of a thin film on the substrate 3 with the movement of the inkjet head 31 from one end to the other end of the substrate 3 in the X-direction. The plasma unit 55 (the head 57 and the driver 59) is supported by the coating part 15.

The transfer apparatus 1 includes a mold installation assisting part 61. The mold installation assisting part 61 is configured so as to wind the mold 7, which has been fed out from the rolled web mold 43 installed in the rolled web mold installation part 45, around the transfer roller 51 and further guide the mold 7 up to the winding roll 47 installed in the winding roll installation part 49. While suppressing the occurrence of wrinkles in a mold 7 fed out from the rolled web mold 43, this guiding is performed under condition that the fed-out mold 7 is substantially stretched, for example.

Figure 13:
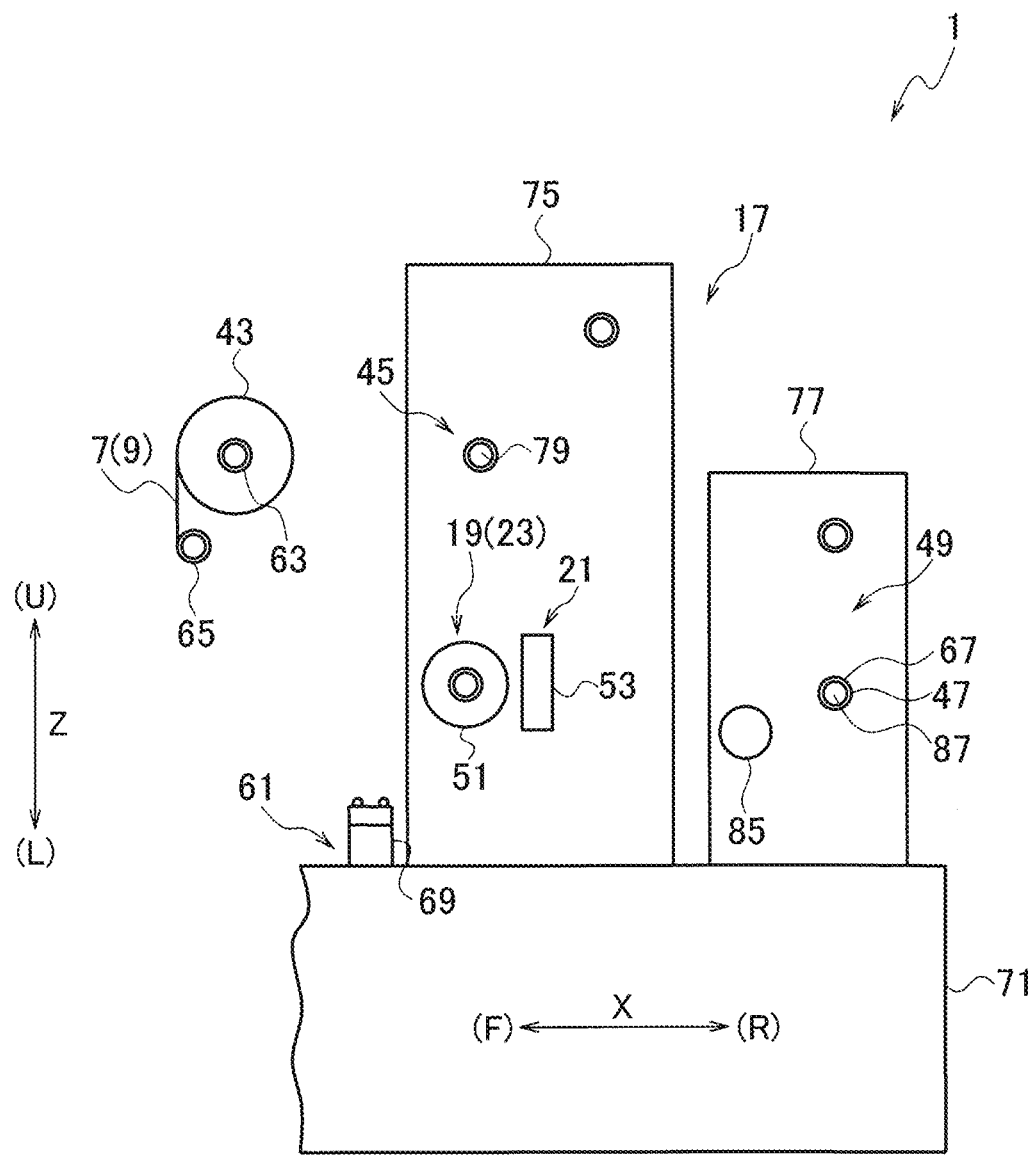
FIG. 13 is a view illustrating the installation of a mold on the transfer apparatus according to the embodiment.
Figure 14:
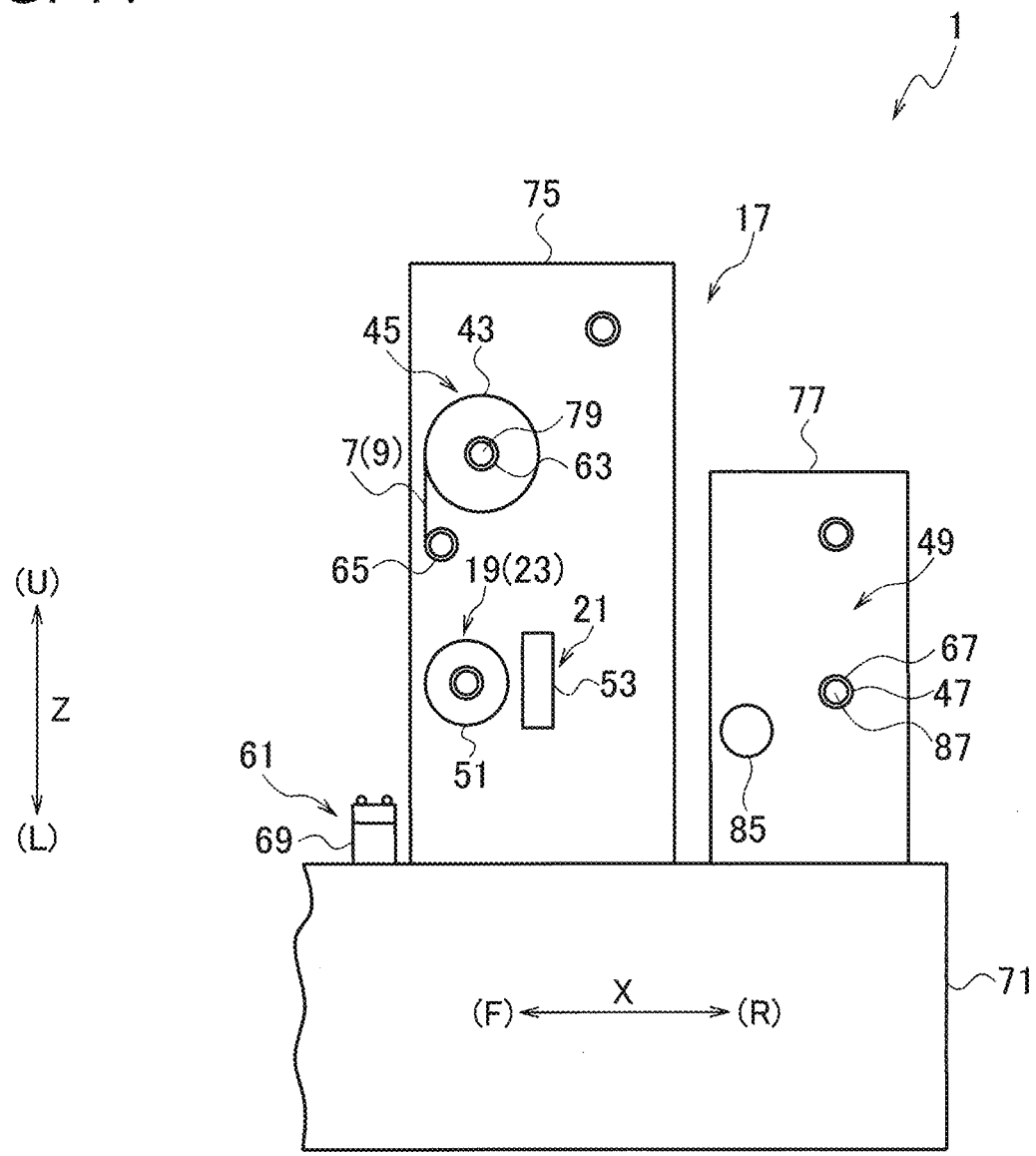
FIG. 14 is a view illustrating the installation of the mold on the transfer apparatus according to the embodiment.

More specifically, in the mold 7 before being installed in the transfer apparatus 1, a major portion on one end side in the longitudinal direction of the mold 7 is wound around a core material 63 of the rolled web mold 43, as illustrated in FIG. 13. Again, in the mold 7 before being installed in the transfer apparatus 1, a minor portion on the other end side in the longitudinal direction of the mold 7 extends from the rolled web mold 43, and a further leading portion of the extended small portion of the mold 7 is installed in a molding supporting part 65 integrally. Although the mold supporting part 65 is separate from the core material 67 of the winding roll 47, the mold supporting part 65 may be formed by the core material 67 of the winding roll 47.

The mold installation assisting part 61 includes a mold installation assisting member 69 that is movable relatively to the rolled web mold installation part 45, the transfer roller 51, and the winding roll installation part 49. The mold supporting part 65 is installed in the mold installation assisting member 69 integrally. Then, with the movement of the mold installation assisting member 69 and the mold supporting part 65 installed in the mold setting assisting member 69, the above-described guiding is accomplished.

The transfer apparatus 1 will be further described below. As illustrated in FIG. 1 and the like, the transfer apparatus 1 includes a base body 71 having an upper surface, for example, a flat surface. The substrate installation body 25 is provided on the upper surface of the base body 71 integrally.

In both the X-direction and the Y-direction, the substrate installation body 25 is positioned in the middle part of the base body 71.

Further, the transfer apparatus 1 includes a first supporting body 73, a second supporting body 75, and a third supporting body 77.

The first supporting body 73 stands upward from the upper surface of the base body 71. The first supporting body 73 is supported to the base body 71 by linear guide bearings (not illustrated) and configured so as to be movable and positionable in relation to the base body 71 in the X-direction by an actuator (not illustrated) such as a servomotor.

The first supporting body 73 carries the inkjet head 31, the head 57 of the plasma unit 55, and the driver 59. The inkjet head 31 is provided integrally with the first supporting body 73.

In the X-direction, the inkjet head 31 is located on the rear side of the first supporting body 73. The head 57 of the plasma unit 55 is located on the rear side of the inkjet head 31 in the X-direction.

In the Z-direction, the inkjet head 31 and the head 57 of the plasma unit 55 are located above the substrate 3 installed in the substrate installation part 13.

The driver 59 of the plasma unit 55 is mounted on the first supporting body 73 integrally.

In an initial state, the first supporting body 73, the inkjet head 31 and the head 57 of the plasma unit 55 are located in the vicinity of the front end portion of the base body 71 in the X-direction. The inkjet head 31 and the head 57 of the plasma unit 55 are adapted so as to be movable from their respective positions in the initial state up to respective positions (see FIG. 8) on the rear side of the substrate installation body 25.

Further, the head 57 of the plasma unit 55 is supported by the first supporting body 73 so as to be movable and positionable in the Z-direction. The head 57 is also adapted so as to be rotatable about an axis C1 extending in the Y-direction and rotationally positioned with a predetermined angle, for example, 90 degrees.

By this rotational positioning, the direction in which plasma is generated can be switched between the rear side in the X-direction and the lower side in the Z-direction.

The inkjet head 31 may be supported by the first support 73 so as to be movable and positionable in the Z-direction.

The second supporting body 75 stands upward from the upper surface of the base body 71. The second supporting body 75 is supported to the base body 71 by linear guide bearings (not illustrated) and configured so as to be movable and positionable in relation to the base body 71 in the X-direction by an actuator (not illustrated) such as a servomotor. As illustrated in FIGS. 2, 3, and 4, the second supporting body 75 is engaged with the base body 71 only on its one side in the Y-direction.

The second support 75 is provided with the rolled web mold installation part 45 and carries the transfer roller 51 and the ultraviolet ray generator 53.

In the Z-direction, the transfer roller 51 and the ultraviolet ray generator 53 are positioned above the substrate 3 installed in the substrate installation part 13. In the Z-direction, the rolled web mold installation part 45 is positioned above the transfer roller 51 and the ultraviolet ray generator 53.

In the X-direction, for example, the rolled web mold installation part 45, the transfer roller 51 and the ultraviolet ray generator 53 are all located inside the second supporting body 75. In the X-direction, the rolled web mold installation part 45 and the transfer roller 51 are positioned on the front side of the second supporting body 75, while the ultraviolet ray generator 53 is positioned behind the transfer roller 51 at a small distance.

In the initial state, the second support body 75 is located on the rear side from the substrate installation body 25 (see FIG. 1). In operation, the second support body 75 is movable from the initial position up to a position (see FIG. 11) where the ultraviolet ray generator 53 is positioned in front of the substrate installation body 25, in the X-direction.

The cylindrical transfer roller 51 is rotatably supported on the second supporting body 75 with the central axis of the transfer roller 51 (a central axis extending in the Y-direction) as the rotation center. Owing to an actuator, such as a servo motor, the transfer roller 51 can rotate at a predetermined torque or rotational speed and also suspend in a predetermined rotational position.

When pressing the mold 7 against the resin 5 of the substrate 3 or peeling off the mold 7 from the resin 5, the transfer roller 51 rotates at a rotation speed synchronized with the moving speed of the transfer roller 51 in the X-direction in order to prevent the occurrence of a slippage of the roller 51 on the mold 7. Incidentally, the transfer roller 51 may be adapted so as to rotate following the movement speed of the transfer roller 51 in the X-direction without using an actuator.

The transfer roller 51 is movable in relation to the second supporting body 75 in the Z-direction. Separately from the transfer roller 51 or together with the roller 51, for example, the ultraviolet ray generator 53 is also movable in relation to the second supporting body 75 in the Z-direction and adapted so as to occupy either an upper end position or a lower end position.

As illustrated in FIGS. 1 and 4, the rolled web mold installation part 45 includes a columnar first shaft member 79. The first shaft member 79 protrudes from the second supporting body 75 on the other end side in the Y-direction. That is, the first shaft member 79 is provided on the second supporting body 75 in a cantilevered manner. Further, the shaft member 79 is rotatably supported on the second supporting body 75 about the central axis of the first shaft member 79 (a central axis extending in the Y-direction) as the rotation center. Owing to an actuator, such as a servo motor, the shaft member 79 can rotate at a predetermined torque or rotational speed and suspend in a predetermined rotational position. The shaft member 79 can stop its rotation with a predetermined torque.

The core material 63 of the rolled web mold 43 is formed in a cylindrical shape. With the first shaft member 79 penetrating through a cylinder of the core material 63, the rolled web mold 43 is installed on the first shaft member 79 integrally. The rolled web mold 43 is adapted so as to be easily attachable and detachable to and from the first shaft member 79 in the form of a cantilever.

Figure 23:
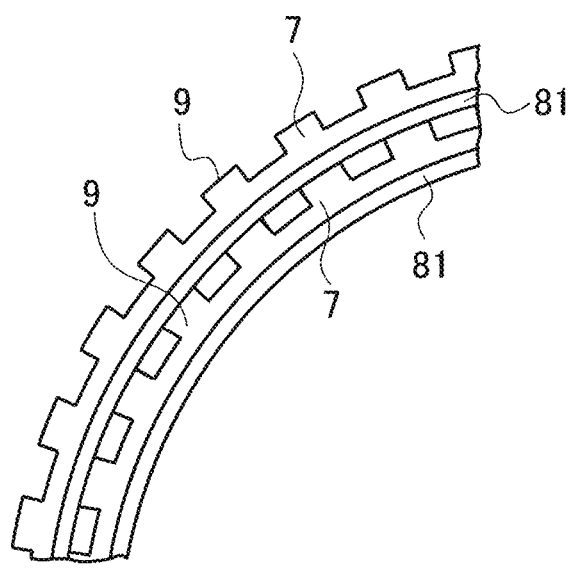
FIG. 23 is an enlarged view of a part XXIII of FIG. 1.

In the rolled web mold 43, as illustrated in FIG. 23, since a slip sheet 81 is inserted between the overlapped molds 7, they are prevented from being damaged or injured. The slip sheet 81 which is no longer needed since the mold 7 extends from the rolled web mold 43 is wound up by a slip sheet winding roll 83 provided on the second supporting body 75, as illustrated in FIG. 1 and the like. The ship sheet 81 wound by the slip sheet winding roll 83 is extended from the slip sheet winding roll 83 again as necessary.

The third supporting member 77 also stands upward from the upper surface of the base body 71 and is provided integrally with the base body 71. As illustrated in FIGS. 2 and 3, the third supporting body 77 is also engaged with the base body 71 only on its one side in the Y-direction.

The third supporting body 77 is provided with the winding roll installation part 49 and also carries the guide roller 85.

In the Z-direction, the position of the lower end of the guide roller 85 coincides with the position of the lower end of the transfer roller 51 when the mold 7 is pressed against the resin 5 of the substrate 3 installed in the substrate installation part 13. Thus, when the mold 7 is pressed against the resin 5 of the substrate 3 installed in the substrate installation part 13, a portion of the mold 7 extending between the guide roller 85 and the transfer roller 51 is due to develop in the horizontal direction.

Additionally, the guide roller 85 may be adapted so as to be freely movable and positionable in relation to the third supporting body 77 in the Z-direction according to the thickness of the substrate 3 or the like.

In the Z-direction, the winding roll installation part 49 is positioned slightly upward from the guide roller 85.

In the X-direction, the winding roll installation part 49 and the guide roller 85 are positioned, for example, inside the third supporting body 77. The third supporting member 77 is located on the rear side of the second supporting member 75 in the X-direction.

The columnar guide roller 85 is rotatably supported on the third supporting member 77 about the central axis of the guide roller 85 extending in the Y-direction as the rotation center. Owing to an actuator, such as a servo motor, the guide roller 85 can rotate at a predetermined torque or rotational speed and suspend in a predetermined rotational position.

When winding up the mold 7 by the winding roll 47 installed in the winding roll installation part 49, the winding roll 47 rotates at a rotation speed synchronized with the moving speed of the transfer roller 51 in the X-direction in order to prevent the occurrence of a slippage of the winding roll 47 on the mold 7. Incidentally, the guide roller 85 may be adapted so as to rotate following the winding speed of the mold 7 without using an actuator.

As illustrated in FIGS. 1 to 3, the winding roll installation part 49 includes a columnar second shaft member 87. The second shaft member 87 protrudes from the third support body 77 on the other end side in the Y-direction. That is, the second shaft member 87 is provided on the third supporting body 77 in a cantilevered manner. Further, the second shaft member 87 is rotatably supported on the third supporting body 77 about the central axis of the second shaft member 87 extending in the Y-direction, as the rotation center. Owing to an actuator, such as a servo motor, the second shaft member 87 can rotate at a predetermined torque or rotational speed and suspend in a predetermined rotational position. The second shaft member 87 can stop its rotation with a predetermined torque.

The core material 67 of the winding roll 47 is formed in a cylindrical shape. With the second shaft member 87 penetrating through a cylinder of the core material 67, the winding roll 47 is installed on the second shaft member 87 integrally. The winding roll 47 is adapted so as to be easily attachable to and detachable from the second shaft member 87.

In the winding roll 47, as illustrated in FIG. 23, the slip sheet 81 is inserted between the overlapped molds 7. In a case that it is required to insert the slip sheet 81 between the overlapping molds 7 as illustrated in FIG. 1 and the like when winding up the mold 7 with the winding roll 47, the slip sheet 81 is supplied from a slip sheet supply roll 89 provided on the third supporting body 77. Then, the slip sheet 81 supplied from the slip sheet supply roll 89 is wound up by the slip sheet supply roll 89 again as necessary.

The mold installation assisting member 69 is arranged on the upper surface of the base body 71 and also supported by the base body 71 through linear guide bearings (not illustrated). Owing to an actuator (not illustrated) such as a servomotor, the mold installation assisting member 69 is movable and positionable in relation to the base body 71 in the X-direction.

When the mold installation assisting member 69 is located at the front most position in the X-direction (see FIG. 15), the mold installation assisting member 69 is located slightly forward of the second supporting body 75 in the initial state and also rearward of the substrate installation body 25.

When the mold installation assisting member 69 is located at the rearmost position in the X-direction (see FIG. 16), the mold installation assisting member 69 is located almost just under the winding roll installation part 49.

In connection, the mold installation assisting member 69 may be configured so as to be movable and positionable in relation to the base body 71 manually (by manpower).

As illustrated in FIG. 3 and the like, the mold installation assisting member 69 is provided at the central portion of the base body 71 on the other end side in the Y-direction than respective engagement portions of the second supporting body 75 and the third supporting body 77 with the base body 71.

Figure 15:
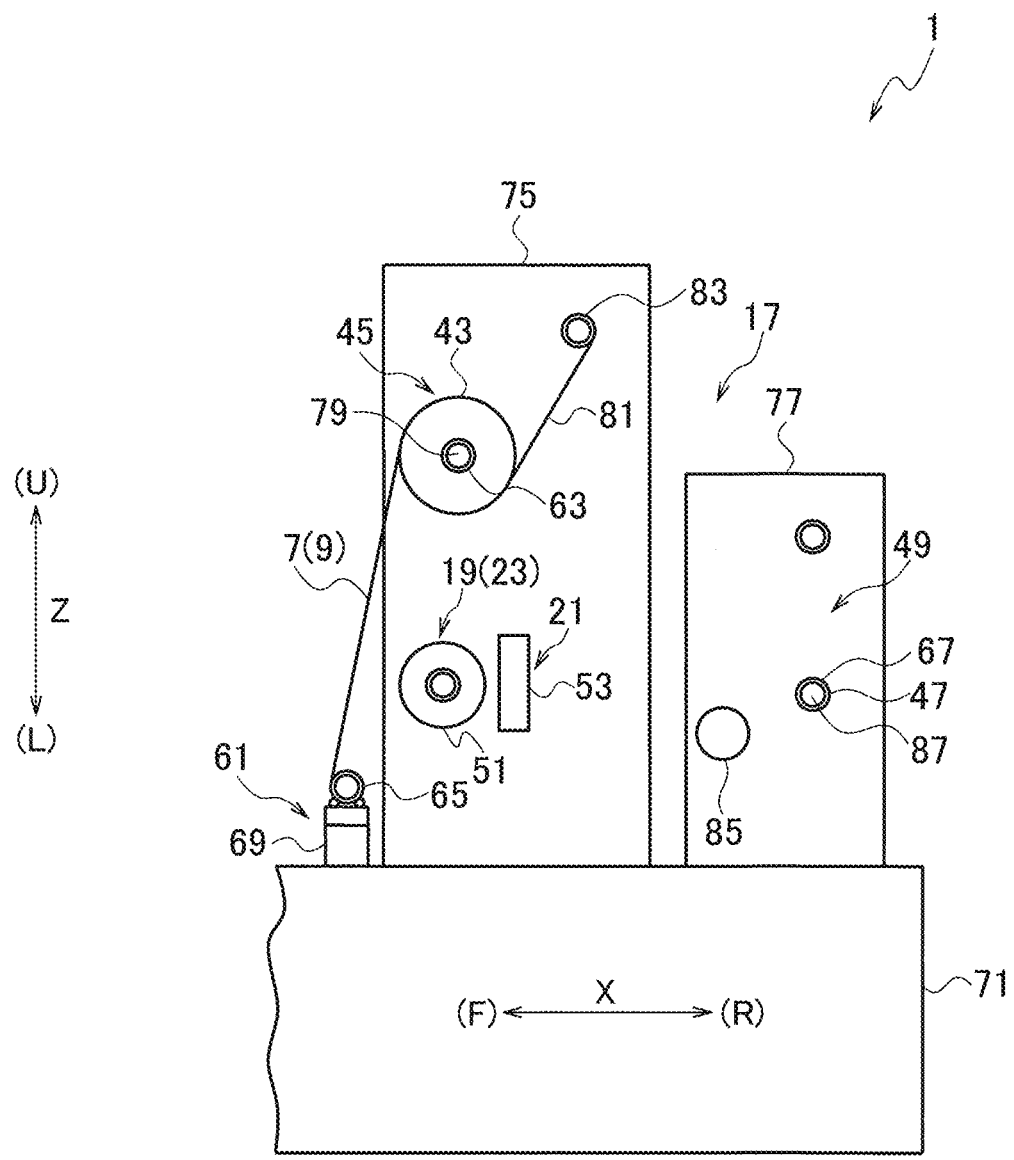
FIG. 15 is a view illustrating the installation of the mold on the transfer apparatus according to the embodiment.

As illustrated in FIG. 15 and the like, the mold installation assisting member 69 is located slightly lower than the guide roller 85 in the Z-direction.

The mold supporting part 65 having the mold 7 extending therefrom is installed on the mold installation assisting member 69 integrally and detachably.

Figure 16:
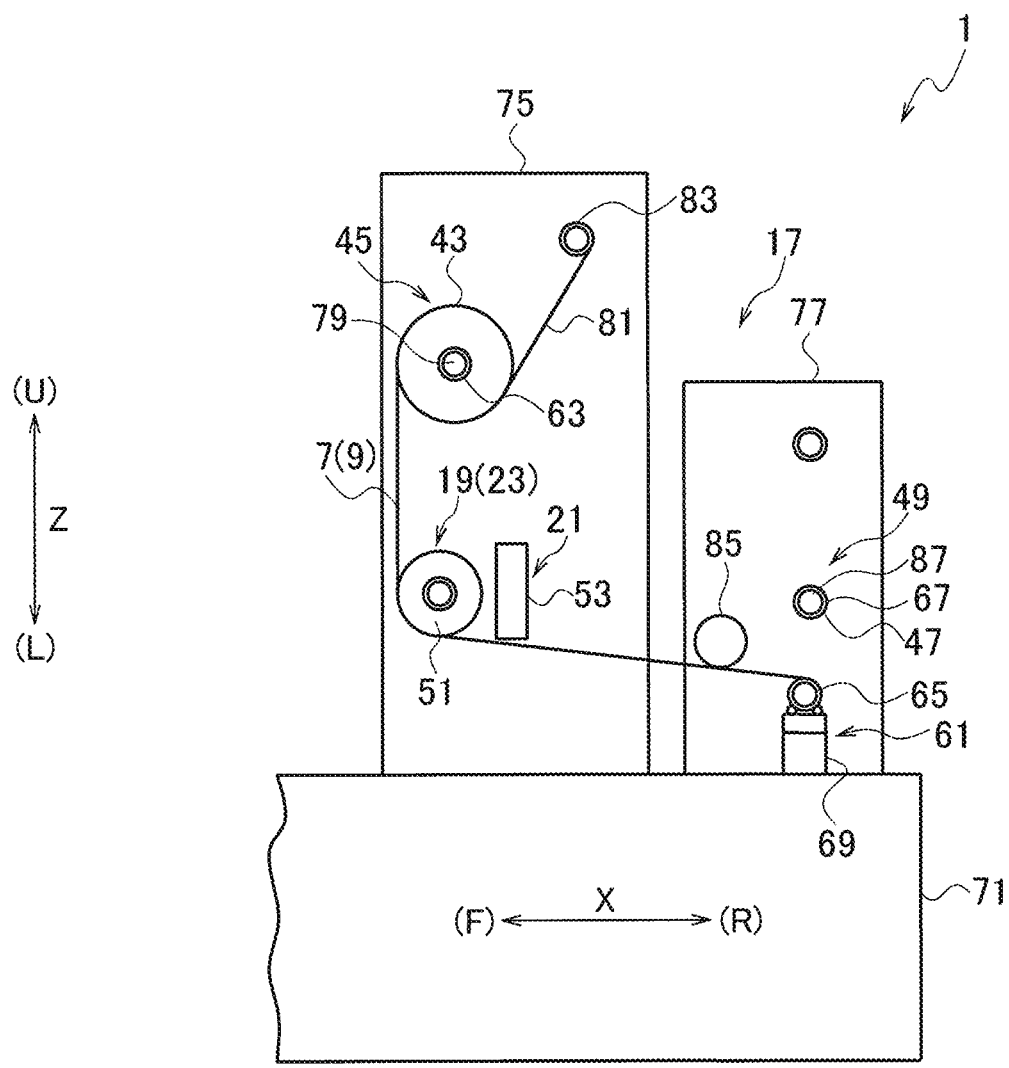
FIG. 16 is a view illustrating the installation of the mold on the transfer apparatus according to the embodiment.

Under the condition of installing the rolled web mold 43 in the rolled web mold installation part 45 and also installing the mold supporting part 65 (to which the leading end of the mold 7 extending from the rolled web mold 43 is fixed) in the mold installation assisting member 69, the mold 7 is wound around the transfer roller 51 and also guided up to the winding roll 47 (for example, up to the vicinity of the winding roll 47 as illustrated in FIG. 16) by moving the mold installation assisting member 69 (the mold supporting part 65) while allowing the mold 7 to extend from the rolled web mold 43.

The leading end of the mold 7 extending from the rolled web mold 43 is attached to the mold supporting portion 65 by an adhesive agent or an adhesive tape.

By guiding the mold supporting part 65 in this way, the mold supporting part 65 having the leading end of the mold 7 adhered thereto reaches the vicinity of the winding roll 47 installed in the winding roll installation part 49. Thereafter, when the leading end of the mold 7 is peeled off from the mold supporting part 65 and subsequently attached to the winding roll 47, the installation of the mold 7 in the transfer apparatus 1 can be accomplished (see FIG. 17 and the like). Further, as described above, the mold supporting part 65 may be adopted as the core material 67 of the winding roll 47.

As illustrated in FIG. 21, transfer roller guide parts 91 may be provided at the front and back of the substrate installation body 25.

In this case, when the mold 7 is pressed against the resin 5 coated on the substrate 3 installed in the substrate installation part 13 by the movement of the transfer roller 51, the transfer roller guide parts 91 serve to guide the movement of the transfer roller 51 carrying the mold 7.

Further, the transfer roller guide parts 91 may be configured so as to eliminate or mitigate a shock produced at the start of pressing the mold 7 against the resin 5 coated on the substrate 3 installed in the substrate installation part 13 with the movement of the transfer roller 51. By eliminating or mitigating the shock, it is possible to eliminate bad effects of the shock on the transfer accuracy.

That is, the transfer apparatus 1 may be configured so that the transfer roller guide parts 91 serve to eliminate or mitigate the shock at the start of pressing the mold 7 against the substrate 3 installed in the substrate installation part 13 with the forward movement of the transfer roller 51 (i.e. a shock produced when the transfer roller 51 abruptly comes into contact with the substrate 3 through the mold 7).

Additionally, the transfer roller guide parts 91 may be configured so as to eliminate or mitigate a shock produced at the end of pressing the mold 7 against the resin 5 coated on the substrate 3 installed in the substrate installation part 13 with the movement of the transfer roller 51 carrying the mold 7.

That is, the transfer apparatus 1 may be configured so that the transfer roller guide parts 91 serve to eliminate or mitigate the shock at the start of peeling off the mold 7 from the substrate 3 installed in the substrate installation part 13 with the backward movement of the transfer roller 51 (i.e. a shock produced when the transfer roller 51 abruptly comes into contact with the substrate 3 through the mold 7).

The transfer roller guide parts 91 include inclined members 93 integrally provided on the front and rear sides of the substrate installation body 25. Each of the inclined members 93 includes a plate-like substrate installation body engaging portion 95 and a substantially flat-shaped transfer roller engaging portion 97 and is formed in an L-shape in view of the Y-direction.

In view of the Y-direction, the substrate installation body engaging portion 95 is formed along the Z-direction and comes in contact with the substrate installation body 25.

In view of the Y-direction (as viewed in the extending direction of the central axis of the transfer roller 51), the transfer roller engaging portion 97 is formed along in the X-direction (i.e. the moving direction of the transfer roller 51) and also extended from the upper end of the substrate installation body engaging portion 95 substantially in the X-direction to depart from the substrate installation body 25.

The transfer roller engaging portion 97 includes a proximal side portion 99 located on the side of the substrate installation body 25 and a distal side portion 101 distant from the substrate installation body 25. The proximal side portion 99 extends in the X-direction, while the distal side portion 101 extends obliquely to the X-direction at a predetermined angle (e.g. a slight angle of 1 to 20 degrees). The boundary between the proximal side portion 99 and the distal side portion 101 is rounded in an arc shape (see reference symbol R of FIG. 21C).

The transfer roller 51 and the mold 7 wrapped around the transfer roller 51 are configured so as to abut on the inclined member 93 over their entire lengths in the Y-direction. Nevertheless, the transfer roller 51 and the mold 7 wrapped around the transfer roller 51 may be configured so as to abut on the inclined member 93 partially. For example, only one end of the transfer roller 51 formed with no transfer pattern or only one end of the mold 7 (one end or the other end of the mold 7 in the Y-direction) wound around the transfer roller 51 may be configured so as to abut on the inclined member 93.

Further, the transfer apparatus 1 is configured so that when the mold 7 is peeled off from the resin 5 by the roll-transferring operation, one transfer roller guide part 91 (the front inclined member 93B) eliminates or mitigates the shock at the start of peeling off the mold 7 from the resin 5, while the other transfer roller guide part 91 (the rear inclined member 93A) eliminates or mitigates the shock at the end of peeling off the mold 7 from the resin 5.

In connection, either the front inclined member 93B or the rear inclined member 93A may be deleted in the modification.

Here, the operation of the transfer roller 51 and the like when starting the pressing of the mold 7 against the ultraviolet curing resin 5 on the substrate 3 (i.e. when the engagement of the transfer roller 51 with the substrate 3 and the like installed in the substrate installation body 25 is started) will be described below.

First, in a state where the transfer roller 51 is positioned on the right side (rear side) more than the position illustrated in FIG. 21A, the transfer roller 51 and the mold 7 are separated from the rear inclined member 93A. When the transfer roller 51 moves to the front side (left side) from the above state, the transfer roller 51 abuts on the distal side portion 101 of the rear inclined member 93A through the mold 7, as illustrated in FIG. 21A. The position of the mold 7 at this abutment (i.e. a portion of the mold 7 abutting on the distal side portion 101) is located slightly lower than the upper surface of the substrate 3 installed in the substrate installation part 13, in the Z-direction.

Additionally, as the inclination angle of the distal side portion 101 is relatively small, it is possible to reduce the shock at the abutment.

When the transfer roller 51 further moves to the front side (left side) from the position illustrated in FIG. 21A, the transfer roller 51 is urged upward by the distal side portion 101, so that the roller 51 moves upward gradually. At this time, the transfer roller 51 maintains its state where it is abutting on the distal side portion 101 through the mold 7.

When the transfer roller 51 further moves to the front side (left side), the transfer roller 51 abuts on the proximal side portion 99 of the rear inclined member 93A through the mold 7.

Then, when the transfer roller 51 further moves to the front side (left side), the transfer roller 51 moves in the horizontal direction (the X-direction) while maintaining the state where the transfer roller 51 is abutting on the proximal side portion 99 through the mold 7. At this time, the position of the mold 7 (i.e. a portion of the mold 7 abutting on the distal side portion 101) coincides with the position of the upper surface of the substrate 3 installed in the substrate installation part 13, in the Z-direction.

When the transfer roller 51 further moves to the front side (left side), as illustrated in FIG. 21B, the pressing of the mold 7 against the resin 5 (the substrate 3) is started. At the start of this pressing, the shock is hardly produced since there is no change in the height of the transfer roller 51. Consequently, the possibility that an edge (or edges) of the substrate 3 and the like may be missing decreases.

Still further, when the transfer roller 51 moves to the front side (left side), the transfer roller 51 abuts on the front inclined member 93B through the mold 7. At this time, since the height of the transfer roller 51 away from the substrate 3 installed in the substrate installation part 13 does not change abruptly, it is possible to eliminate or mitigate the shock at the end of the pressing process that the mold 7 is pressed against the substrate 3 through the transfer roller 51, whereby the possibility that an edge (or edges) of the substrate 3 and the like may be missing decreases.

Incidentally, although FIG. 21C illustrates an arrangement where the rear inclined member 93A (or the front inclined member 93B) and the substrate 3 are slightly spaced apart from each other by a small distance L3 in the X-direction (e.g. a distance smaller than the thickness of the substrate 3 and much smaller than the radius of the transfer roller 51), the distance L3 may be zero.

Further, the rear inclined member 93A (the front inclined member 93B) may be configured so that its height can be adjusted in relation to the substrate installation body 25 according to the thickness of the substrate 3.

The operation of the transfer roller 51 and the like at the time of peeling off the mold 7 from the cured ultraviolet curing resin 5 (the substrate 3) is opposite to the operation of the transfer roller 51 at the time of starting the above-mentioned pressing of the mold 7 against the resin 5. However, the transfer roller 51 and the mold 7 abut on the front inclined member 93B in advance.

The transfer apparatus 1 may be configured so as to omit the rear inclined member 93A or the front inclined member 93B. In FIG. 1 and the like, these components are deleted.

Next, the operation of the transfer apparatus 1 will be described.

In an initial state, as illustrated in FIG. 1, there are illustrated various situations: the mold 7 is installed in the transfer apparatus; the first supporting body 73 is positioned at the front end position; the second supporting body 75 is positioned at the rear end position; the head 57 of the plasma unit 55 generating no plasma is positioned at the upper end position; and the transfer roller 51 and the ultraviolet ray generator 53 are positioned at the upper end position. Additionally, the substrate 3 is mounted on the substrate installation body 25.

The upper part of the substrate installation body 25 is formed of a conductive material to act as an electrode when irradiating plasma.

Under the control of the control unit 41, from the above-mentioned initial state, it is performed to position the head 57 of the plasma unit 55 at the lower end position (see FIG. 6) and further move the first support body 73 to the rear side (see FIG. 7) while generating plasma from the head 75 toward the lower substrate 3. Further, with the inkjet head 31, it is performed to coat the uncured ultraviolet curing resin 5 on the substrate 3.

Figure 8:
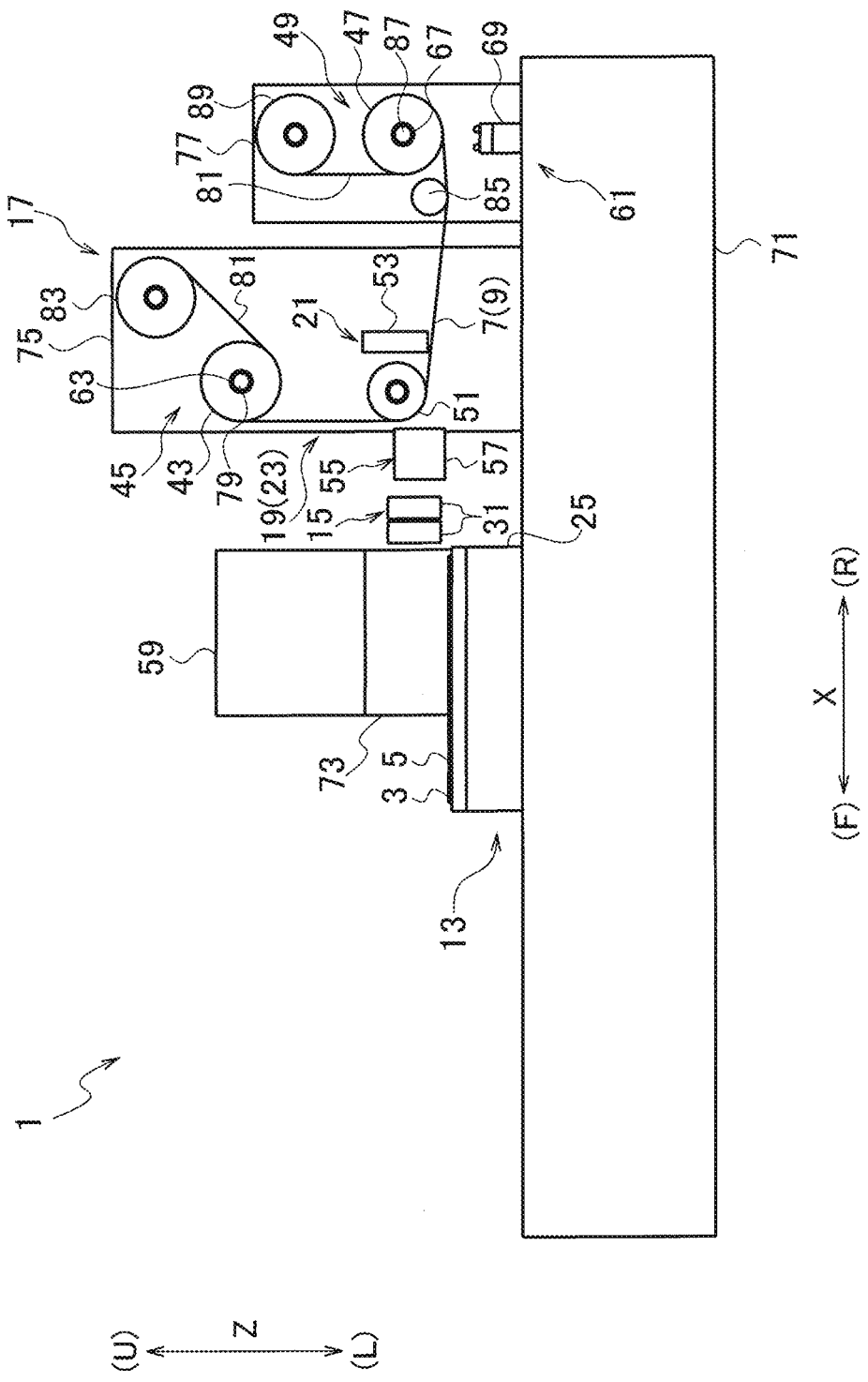
FIG. 8 is a view illustrating the operation of the transfer apparatus according to the embodiment.

FIG. 8 illustrates a state where the process of coating the uncured ultraviolet curing resin 5 on the substrate 3 has been completed. In this state, plasma is not generated from the head 57 and furthermore, the discharge of the uncured ultraviolet curing resin 5 from the inkjet head 31 is also stopped.

Figure 9:
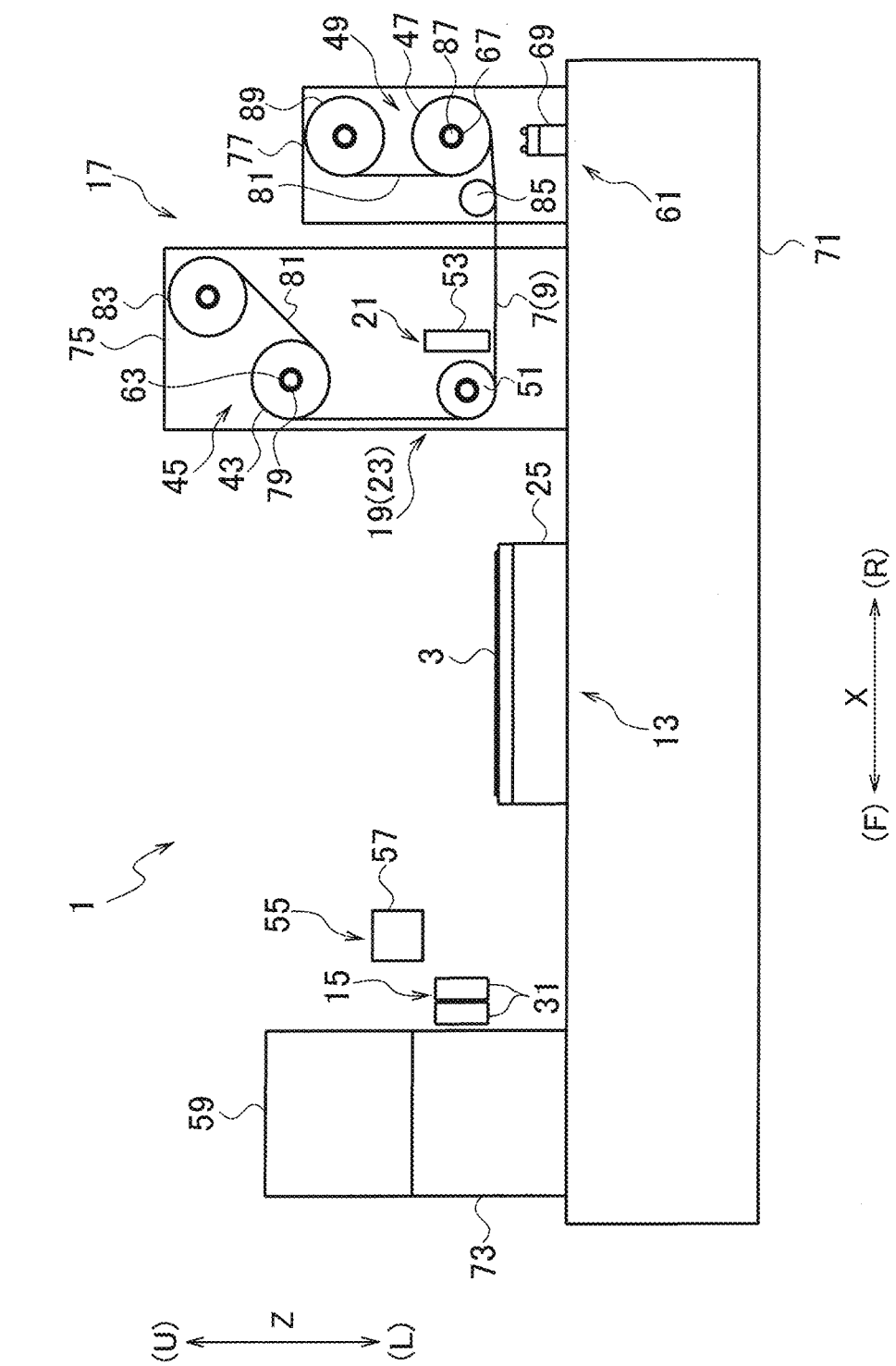
FIG. 9 is a view illustrating the operation of the transfer apparatus according to the embodiment.

Subsequently, with the forward movement of the first supporting body 73, it is performed to position it at the front end position and also position the transfer roller 51 and the ultraviolet ray generator 53 at the lower end position, as illustrated in FIG. 9.

Figure 10:
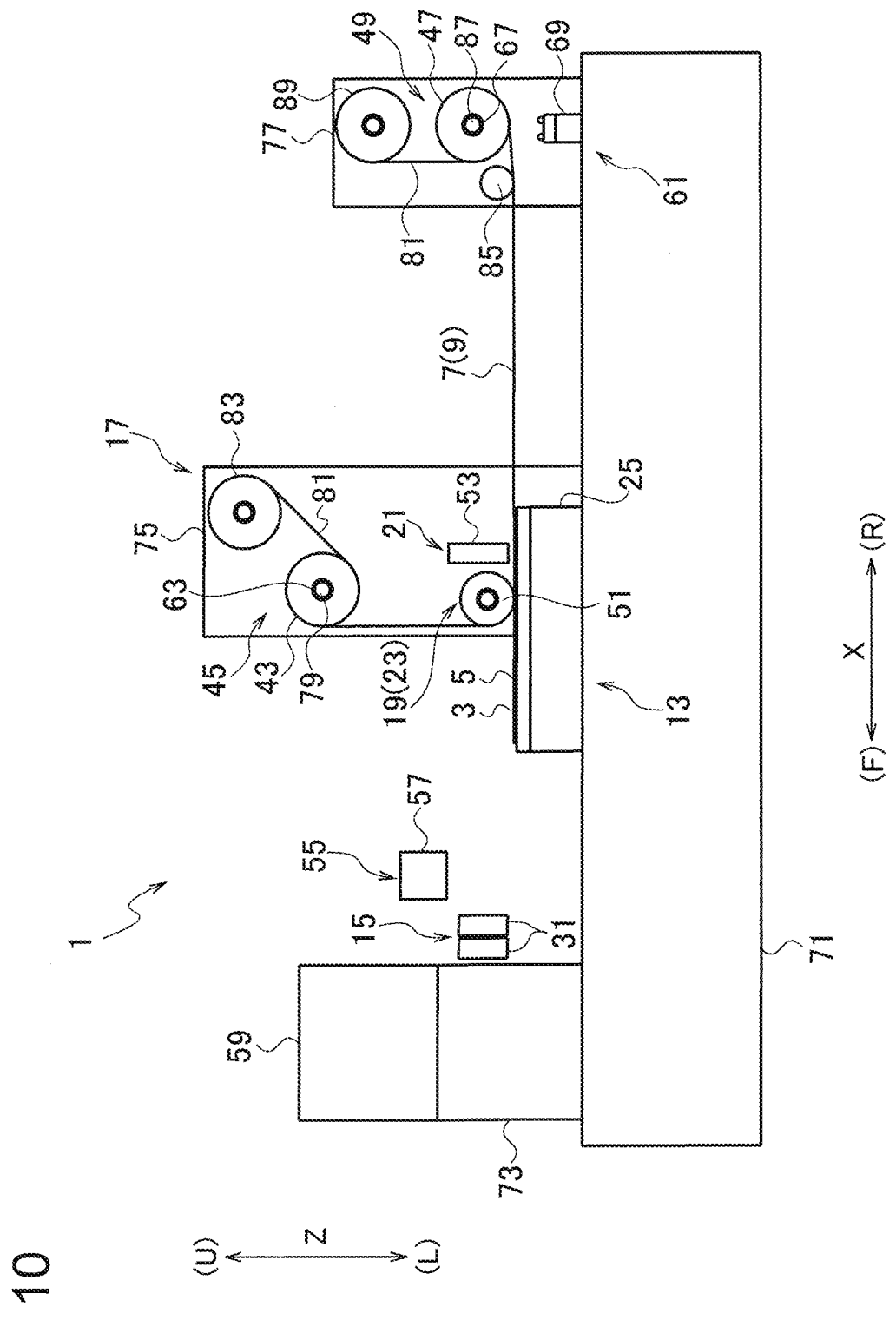
FIG. 10 is a view illustrating the operation of the transfer apparatus according to the embodiment.

Next, as illustrated in FIG. 10, it is performed to press the mold 7 against the substrate 3 while moving the second supporting member 75 to the front side. At this time, the mold 7 extends from the rolled web mold 43 as the transfer roller 51 moves to the front side, and the ultraviolet curing resin 5 of the substrate 3 is irradiated with ultraviolet rays from the ultraviolet ray generator 53.

Figure 11:
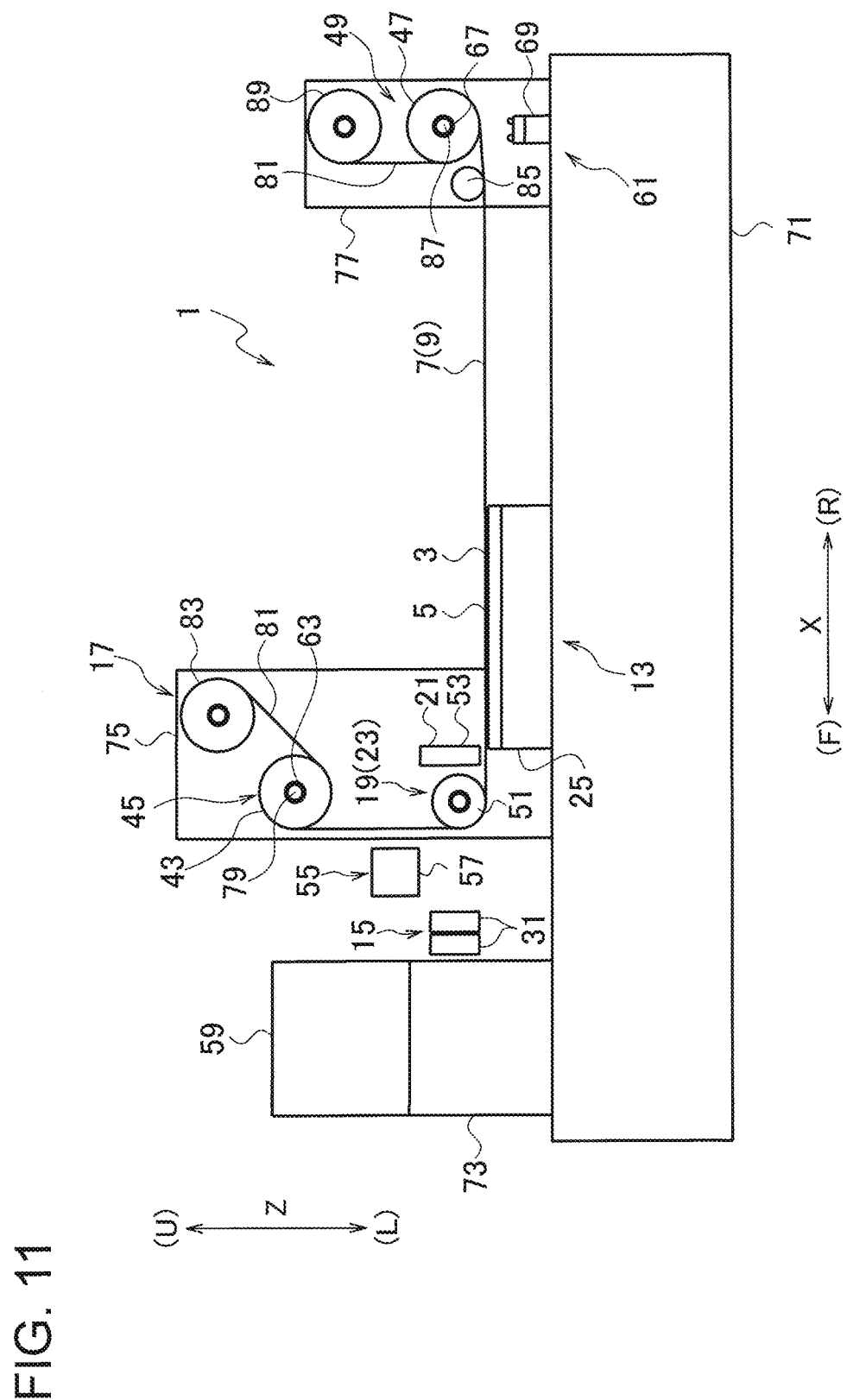
FIG. 11 is a view illustrating the operation of the transfer apparatus according to the embodiment.

FIG. 11 illustrates a state where the process of pressing the mold 7 against the substrate 3 has been completed. In this state, ultraviolet rays are not generated from the ultraviolet ray generator 53.

Subsequently, from the state illustrated in FIG. 11, it is performed to move the second supporting member 75 to the rear side and peel off the mold 7 from the substrate 3 and the resin 5. Then, the mold 7 is wound up by the rolled web mold 43, and the ultraviolet curing resin 5 of the substrate 3 is irradiated with ultraviolet rays from the ultraviolet ray generator 53.

In the state where the peeling of the mold 7 from the substrate 3 and the resin 5 has been completed (see FIG. 12), the second supporting member 75 is located at the rear end position, so that the operation of transferring the transfer pattern 9 of the mold 7 to the resin 5 of the substrate 3 is completed. In a case of performing the next transfer operation, the substrate 3 is replaced by a substrate 3 to be subjected to next transfer.

Next, the cleaning process of the mold 7 by the plasma unit 55 will be described.

An object of the mold 7 to be cleaned up by the plasma unit 55 is a portion of the mold 7 (particularly, the fine transfer pattern 9) which has been used for the transfer operation to the ultraviolet curing resin 5 of the substrate 3.

Figure 12:
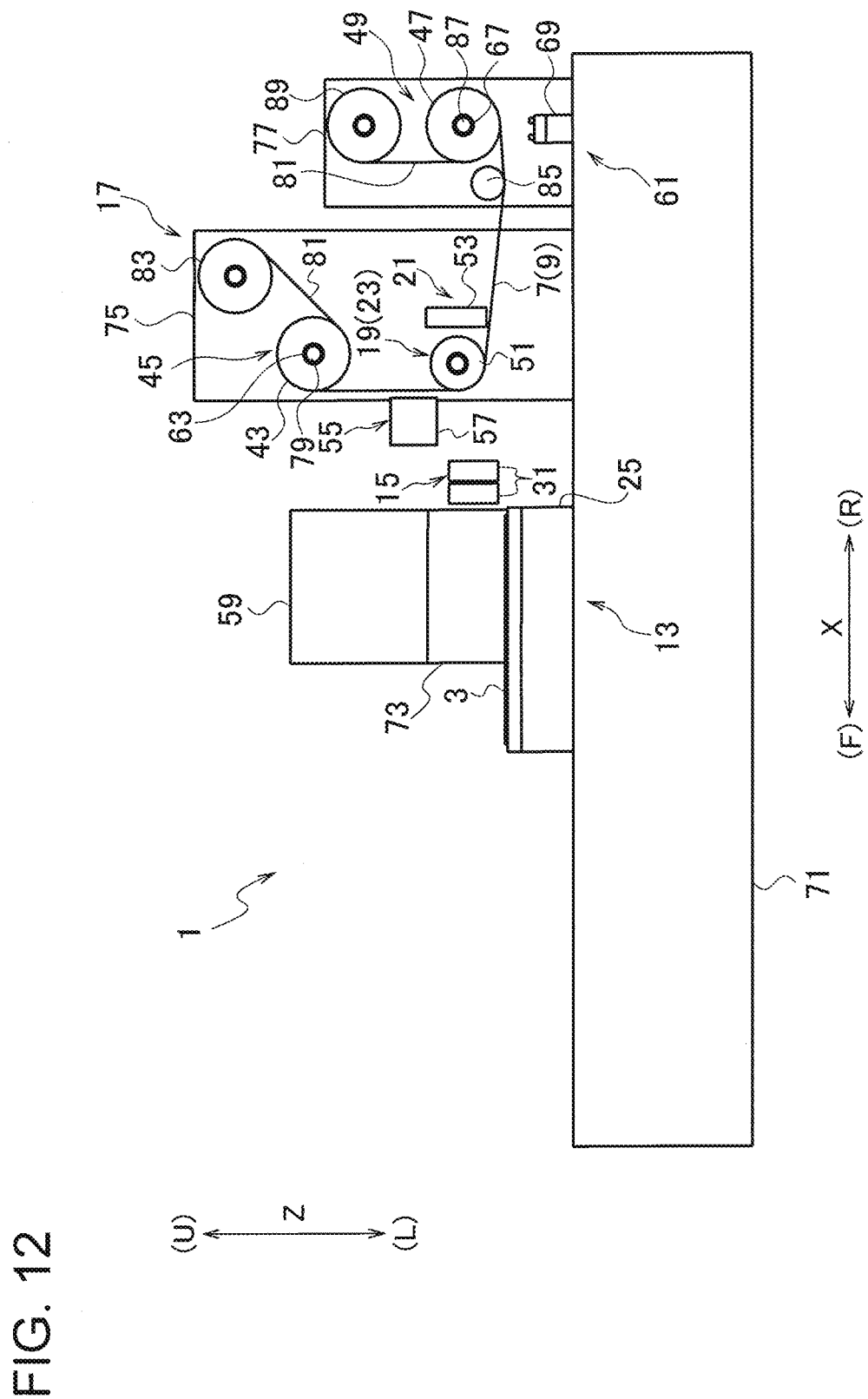
FIG. 12 is a view illustrating the operation of the transfer apparatus according to the embodiment.

As illustrated in FIG. 12, it is performed to position the head 57 of the plasma unit 55 at the upper end position and rotate the head 57 about the axis C1 of FIG. 1 so as to generate plasma toward the rear side, thereby allowing the first support body 73 to be positioned at the rear end position and allowing the head 57 to be positioned in the vicinity of the mold 7.

In the state of FIG. 12, plasma is generated from the head 57 toward the mold 7, and the whole portion of the mold 7 used for the transfer operation to the resin 5 of the substrate 3 is irradiated with plasma for cleaning while appropriately performing the delivery and winding processes of the mold 7 by the rolled web mold 43 and the winding roll 47.

A conductive plate (not illustrated) is provided on the opposite side of the head 57 through the mold 7. This conductive plate acts as an electrode when the plasma unit 55 irradiates the plasma to the mold 7.

Next, the installation of the mold 7 on the transfer apparatus 1 using the mold installation assisting part 61 will be described.

We now assume, as an initial state, that: the second supporting body 75 is positioned at the rear end position; the mold installation assisting member 69 is positioned at the front end position; and the rolled web mold 43 is not installed in the rolled web mold installation part 45, as illustrated in FIG. 13.

In the initial state as described above, it is performed to install the core material 63 in the rolled web mold 43 (see FIG. 14), appropriately extend the mold 7 from the rolled web mold 43 and install the mold supporting part 65 integrally with the installation assisting member 69 (see FIG. 15).

Subsequently, by moving the mold installation assisting member 69 to the rear side while appropriately extending the mold 7 from the rolled web mold 43, it is performed to make a situation where the mold installation assisting member 69 is positioned at the rear end position (see FIG. 16). During this movement, the mold 7 extending between the rolled web mold 43 and the mold supporting part 65 is wound around the transfer roller 51 and the guide roller 85.

Figure 17:
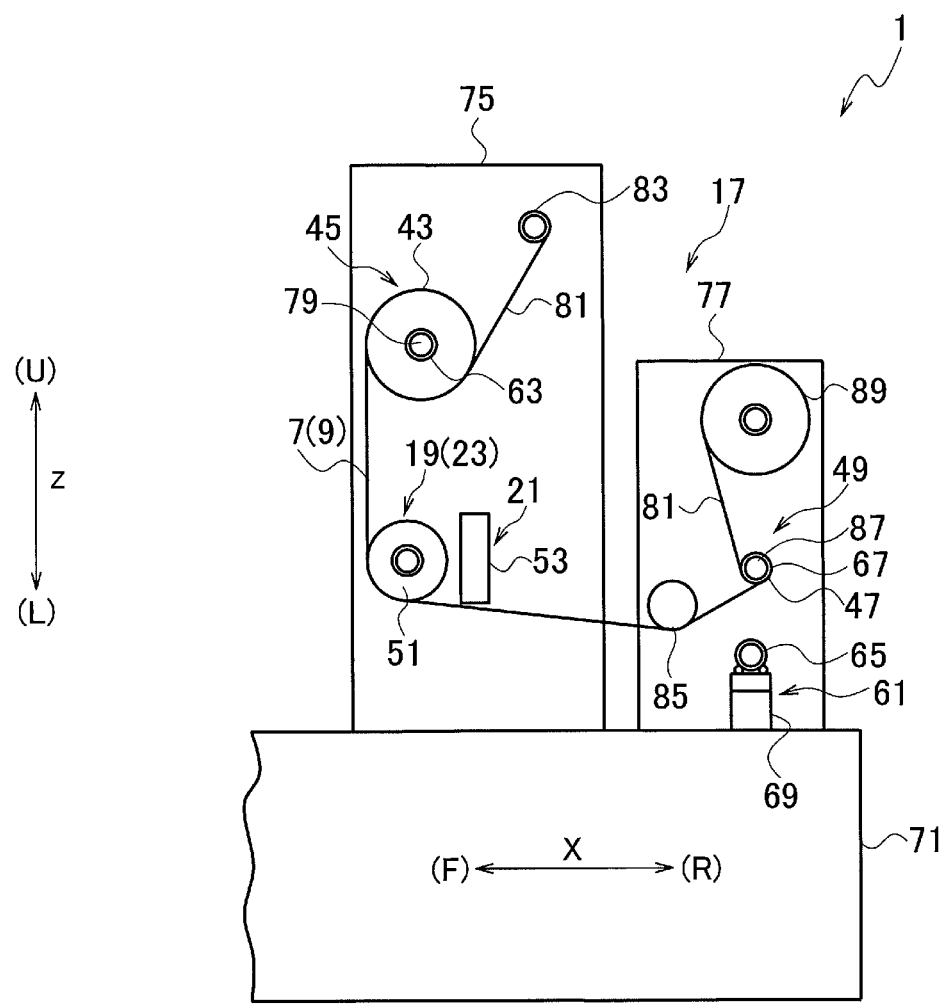
FIG. 17 is a view illustrating the installation of the mold on the transfer apparatus according to the embodiment.

Subsequently, it is performed to detach the leading end of the mold 7 from the mold supporting part 65 and fix the leading end to the core material 67 of the winding roll 47 (see FIG. 17).

According to the transferring apparatus 1, since the inkjet head 31 is used to coat the substrate 3 with the uncured resin 5, it is possible to improve the coating accuracy of the uncured resin 5 to be applied to the substrate 3 (for example, the accuracy of a film thickness of the ultraviolet curing resin 5). That is, it is possible to provide the resin 5 on the substrate 3 more precisely and thinly, in comparison with the other coating methods such as spraying.

With the improved accuracy of a film thickness of the resin 5, the volume of the resin 5 before the transfer operation can be generally equalized with that of the resin 5 after the transfer operation, thereby allowing the residual film 11 after the transfer operation to be reduced in thickness as much as possible or allowing the generation of the residual film 11 to be suppressed.

Further, according to the transferring apparatus 1, since the plurality of inkjet heads 31 is arranged, it is possible to apply the uncured ultraviolet curing resin 5 only to a portion of the substrate 3 requiring to be coated with the resin 5. For example, by optionally setting the inkjet head(s) 31 intended to discharge the uncured ultraviolet curing resin 5 from among the plurality of inkjet heads 31, it is possible to cope with even a change in the size of the substrate 3 flexibly. Further, in case of transferring a plurality of transfer patterns 9 by one time of transfer (for example, when it is required to secure four or eight pieces from one substrate 3), it is possible to cope with a change in the form of the mold 7 (e.g. a change from 8-pieces to 4-pieces to be secured) flexibly.

According to the transferring apparatus 1, additionally, since the plurality of inkjet heads 31 is disposed alternately, a gap between the inkjet heads 31 (which would produce a substrate portion where the resin 5 is not applied) is prevented from occurring when coating the substrate 3 with the uncured ultraviolet curable resin 5.

According to the transferring apparatus 1, as illustrated in FIG. 20, since the uncured ultraviolet curable resin 5 on the substrate 3 is formed in a shape corresponding to the fine transfer pattern 9 formed in the mold 7, the flow rate of the uncured ultraviolet curable resin 5 at the time of performing the transfer operation is reduced to allow the occurrence of the residual film 11 to be further suppressed and additionally, the shape of the transfer pattern 9 on the resin 5 becomes precise with high geometrical accuracy.

Further, according to the transfer apparatus 1, since the ultraviolet curing resin 5 is irradiated with ultraviolet rays when the transfer roller 51 is moving to the front side and when the transfer roller 51 is moving to the rear side, it is possible to spend a long time for irradiating the resin 5 with ultraviolet rays, thereby allowing the ultraviolet curable resin 5 to be securely cured without using a large-output ultraviolet ray generator 53 (i.e. without enlarging the ultraviolet ray generator 53).

Further, according to the transfer apparatus 1, the fine transfer pattern 9 of the mold 7 peeled off from the ultraviolet curing resin 5 of the substrate 3 after the transfer operation is cleaned by the plasma unit 55. Thus, even when the mold 7 is repeatedly used a plurality of times, it is possible to prevent the deterioration of the releasability of the mold 7 and the deterioration of the configuration of a pattern to be transferred to the resin 5 of the substrate 3.

Further, according to the transfer apparatus 1, since the wettability of the substrate 3 is improved by the plasma unit 55, it is possible to enhance the adhesion strength between the substrate 3 and the resin 5 due to the increased hydrophilicity of the substrate 3.

Further, according to the transfer apparatus 1, since the plasma unit 55 is supported by the coating part 15 which is not voluminous with a small volume for installation, the large and bulky driver 59 of the plasma unit 55 is arranged with ease.

Further, according to the transferring apparatus 1, since it is provided with the mold installation assisting part 61 that winds the mold 7, which has been fed out from the rolled web mold 43 in the rolled web mold installation part 45, around the transfer roller 51 and also guides the mold 7 up to the winding roll 47 in the winding roll installation part 49, the precise installation of the mold 7 into the transfer apparatus 1 can be performed without requiring a skilled person, easily and quickly.

Meanwhile, it is noted that in the above explanation, one transfer pattern 9 is transferred to the resin 5 of one substrate 3 by performing one transfer operation to the substrate 3. In the modification, however, the transfer apparatus 1 may be configured so as to transfer a plurality of transfer patterns 9 to the resin 5 on one substrate 3 by performing one transfer operation to the substrate 3.

In the case where the plurality of transfer patterns 9 is transferred to the resin 5 of one substrate 3, the substrate 3 will be divided into a plurality of substrate portions each having a single transfer pattern 9 transferred thereto, thereby producing a plurality of products or semi-products.

For example, when a transfer pattern (for example, the same transfer pattern) 9 is transferred to each of the four portions where the resin 5 of one substrate 3 is provided by one transfer, the substrate 3 is divided into four equal parts By dividing it, you will get 4 products or semi-finished products.

In the above description, the transfer operation is performed on condition of winding a part of the mold 7 extending between the rolled web mold 43 and the winding roll 47 around the transfer roller 51. In the modification, however, the transfer operation may be performed on condition of fixing one mold (a short mold whose length is equivalent to that of an outer circumference of the transfer roller 51) 7 to the outer circumference of the transfer roller 51 (or winding one mold around the roller 15 integrally). In this case, the mold 7 will be detachably (exchangeably) provided on the transfer roller 51.

That is, the transfer apparatus 1 may be configured so as to perform, in the transfer operation, the pressing process of the mold 7 against the resin 5 and the peeling-off process of the mold 7 from the resin 5 by moving the transfer roller 51 from one end of the substrate 3 to the other end in the X-direction under condition that the mold 7 is pressed against the substrate 3 and the uncured resin 5 in the than of a thin film coated on the substrate 3. In this modification, thermoplastic resin could be used as the resin 5 in some cases.

It should be noted that the above-described matters can be grasped as constituents of an invention of process.

That is, the present application may be grasped as a transfer method of transferring a fine transfer pattern 9 formed on a mold 7 to a resin 5 coated on a substrate 3, the transfer method including a coating step of ejecting the uncured resin 5 in the form of fine particles from a inkjet head 31, thereby coating the substrate 3 with the resin 5.

Alternatively, the present application may be grasped as a transfer method of transferring a fine transfer pattern 9 formed on a mold 7 to a resin 5 coated on a substrate 3, the transfer method including a plasma irradiation step of irradiating plasma to the fine transfer pattern 9 of the mold 7 peeled off from the resin 5 of the substrate 3 after transfer.

Also, the present application may be grasped as a transfer method of transferring a fine transfer pattern 9 formed on a mold 7 to a resin 5 coated on a substrate 3, the transfer method including: a rolled web mold installation step of installing the rolled web mold 43 around which the mold 7 is wound, in a rolled web mold installation part 45; a mold winding step of winding the mold 7, which has been fed out from the rolled web mold 43 installed at the rolled web mold installation step, around the transfer roller 51; a mold winding roll installation step of installing an end of the mold 7, which has been fed out from the rolled web mold 43 installed in the rolled web mold installation part 45 at the rolled web mold installation step and then wound around the transfer roller 51, in a winding roll 47 installed in a winding roll installation part 49; and a mold guide step to be performed when the mold winding step and the mold winding roll installation step are performed after installing the rolled web mold 43 at the rolled web mold installation step, wherein the mold guide step includes: winding the mold 7, which has been fed out from the rolled web mold 43 installed in the rolled web mold installation part 45, around the transfer roller 51 under condition that a fed-out portion of the mold fed out from the rolled web mold 43 is stretched while suppressing an occurrence of wrinkles in the fed-out portion; and guiding the wound mold up to the vicinity of the winding roll 47 installed in a winding roll installation part 49 with use of a mold installation assisting part 61.

In this case, before performing the rolled web installation step, the mold winding step and the mold winding roll installation step, a major portion on one end side in the longitudinal direction of the mold 7 is wound around a core material 63 of the rolled web mold 43, while a small mold portion on the other end side in the longitudinal direction of the mold 7 is extended from the rolled web mold 43, and a further leading end of the extended small portion of the mold 7 is installed in a molding supporting part 65. The mold installation assisting part 61 includes a mold installation assisting member 69 which is freely movable to all of the rolled web mold 45, the transfer roller 51 and the winding roll installation part 49 and in which the mold supporting part 65 is installed.

What is claimed is:

1. A transfer apparatus for transferring a fine transfer pattern formed on a mold to a resin coated on a substrate, comprising:
   a rolled web mold installation part configured to install a rolled web mold around which the mold is wound;
   a transfer roller configured to wind the mold, fed out from the rolled web mold installed in the rolled web mold installation part, around the transfer roller;
   a winding roll configured to wind up the mold fed out from the rolled web mold installed in the rolled web mold installation part and also wound around the transfer roller;
   a winding roll installation part configured to install the winding roll therein; and
   a mold installation assisting part configured to hold a leading end of the mold extended from the rolled web mold and move relative to and against the rolled web mold installation part, the transfer roller, and the winding roll installation part, the mold installation assisting part being configured to:
      wind the mold, which has been fed out from the rolled web mold installed in the rolled web mold installation part, around the transfer roller while suppressing an occurrence of wrinkles in a fed-out portion of the mold; and guide the leading end of the mold extended from the rolled web mold up to the vicinity of the winding roll installed in the winding roll installation part.

2. The transfer apparatus of claim 1, wherein
a major portion of the mold on one end side thereof in a longitudinal direction before the mold is installed in the transfer apparatus is wound around a core material of the rolled web mold,
a minor portion of the mold on the other end side thereof in the longitudinal direction before the mold is installed in the transfer apparatus is extended from the rolled web mold,
the leading end of the mold extended from the rolled web mold is installed in a mold supporting part,
the mold installation assisting part includes a mold installation assisting member which is freely movable in relation to all of the rolled web mold installation part, the transfer roller, and the winding roll installation part, and
the mold supporting part is installed in the mold installation assisting member.

3. The transfer apparatus of claim 2, wherein the mold supporting part is used as a core material of the winding roll, the core material being configured to fix the leading end of the mold extended from the rolled web mold.

4. A transfer method for transferring a fine transfer pattern formed on a mold to a resin coated on a substrate, the transfer method comprising:
installing a rolled web mold around which the mold is wound, in a rolled web mold installation part;
winding the mold, fed out from the rolled web mold installed in the rolled web mold installation part, around a transfer roller;
installing an end of the mold, which has been fed out from the rolled web mold installed in the rolled web mold installation part and further wound around the transfer roller, in a winding roll installed in a winding roll installation part;
winding the mold, which has been fed out from the rolled web mold installed in the rolled web mold installation part, around the transfer roller while suppressing an occurrence of wrinkles in a fed-out portion of the mold, after installing the rolled web mold in the rolled web mold installation part and when executing winding the mold around the transfer roller and installing the end of the mold in the winding roll;
holding a leading end of the end of the mold extended from the rolled web mold to the mold installation assisting part;
moving the mold installation assisting part relative to and against the rolled web mold installation part, the transfer roller, and the winding roll installation part; and
guiding the leading end of the mold extended from the rolled web mold up to the vicinity of the winding roll installed in the winding roll installation part with use of the mold installation assisting part.

5. The transfer method of claim 4, wherein,
a major portion of the mold on one end side thereof in a longitudinal direction before installing the rolled web mold in the rolled web mold installation part is wound around a core material of the rolled web mold,
a minor portion of the mold on the other end side thereof in the longitudinal direction before installing the rolled web mold in the rolled web mold installation part is extends from the rolled web mold,
the leading end of the mold extended from the rolled web mold is installed in a mold supporting part,
the mold installation assisting part includes a mold installation assisting member which is freely movable in relation to all of the rolled web mold installation part, the transfer roller and the winding roll installation part, and
the mold supporting part is installed in the mold installation assisting member.

6. The transfer method of claim 5, wherein
the mold supporting part is used as a core material of the winding roll, the core material fixing the leading end of the mold extended from the rolled web mold.

* * * * *